US012483826B2

(12) United States Patent

Xuan et al.

(10) Patent No.: US 12,483,826 B2
(45) Date of Patent: Nov. 25, 2025

(54) AUDIO PROCESSING METHOD AND ELECTRONIC DEVICE

(71) Applicant: Beijing Honor Device Co., Ltd., Beijing (CN)

(72) Inventors: Jianyong Xuan, Beijing (CN); Zhenyi Liu, Beijing (CN); Xiao Yang, Beijing (CN); Risheng Xia, Beijing (CN)

(73) Assignee: BEIJING HONOR DEVICE CO., LTD., Beijing (CN)

( * ) Notice: Subject to any disclaimer, the term of this patent is extended or adjusted under 35 U.S.C. 154(b) by 0 days.

(21) Appl. No.: 18/010,417

(22) PCT Filed: May 24, 2022

(86) PCT No.: PCT/CN2022/094708

§ 371 (c)(1),
(2) Date: Dec. 14, 2022

(87) PCT Pub. No.: WO2023/005383

PCT Pub. Date: Feb. 2, 2023

(65) Prior Publication Data

US 2024/0292150 A1 Aug. 29, 2024

(30) Foreign Application Priority Data

Jul. 27, 2021 (CN) ........................ 202110851254.4

(51) Int. Cl.
*H04R 3/00* (2006.01)
*H04R 1/40* (2006.01)

(52) U.S. Cl.
CPC ............ *H04R 3/005* (2013.01); *H04R 1/406* (2013.01); *H04R 2410/05* (2013.01)

(58) Field of Classification Search
CPC .... H04R 3/005; H04R 1/406; H04R 2410/05; G10L 21/0264; G10L 25/06;
(Continued)

(56) References Cited

U.S. PATENT DOCUMENTS

| | | | |
|---|---|---|---|
| 7,697,699 | B2 | 4/2010 | Ozawa |
| 8,861,745 | B2 | 10/2014 | Yen et al. |

(Continued)

FOREIGN PATENT DOCUMENTS

| | | | |
|---|---|---|---|
| CN | 1684189 | A | 10/2005 |
| CN | 1868235 | A | 11/2006 |

(Continued)

*Primary Examiner* — Angelica M Mckinney

(74) *Attorney, Agent, or Firm* — WOMBLE BOND DICKINSON (US) LLP

(57) ABSTRACT

An audio processing method is provided. The method includes: at a first time point, obtaining a first audio signal and a second audio signal, where the first audio signal is used to indicate information acquired by the first microphone, and the second audio signal is used to indicate information acquired by the second microphone; determining according to a correlation between the first audio signal and the second audio signal, that the first audio signal includes a first noise signal and that the second audio signal includes no first noise signal; and performing processing on the first audio signal to obtain a third audio signal, where the third audio signal includes no first noise signal.

19 Claims, 12 Drawing Sheets

(58) Field of Classification Search
CPC ....... G10L 2021/02165; G10L 21/0208; G10L 21/0216; G10K 2210/3018
See application file for complete search history.

(56) References Cited

U.S. PATENT DOCUMENTS

| | | | | |
|---|---|---|---|---|
| 10,182,291 | B2 | 1/2019 | Kanamori | |
| 2002/0037088 | A1 | 3/2002 | Dickel et al. | |
| 2002/0048377 | A1 | 4/2002 | Vaudrey et al. | |
| 2007/0009121 | A1 | 1/2007 | Petersen | |
| 2010/0046770 | A1 | 2/2010 | Chan et al. | |
| 2012/0140946 | A1 | 6/2012 | Yen et al. | |
| 2012/0250917 | A1 | 10/2012 | Pape et al. | |
| 2019/0090075 | A1* | 3/2019 | Lee | H04R 29/001 |
| 2020/0410993 | A1 | 12/2020 | Mäkinen et al. | |
| 2022/0141581 | A1 | 5/2022 | Vilkamo et al. | |
| 2022/0208206 | A1* | 6/2022 | Furuta | H04R 3/005 |

FOREIGN PATENT DOCUMENTS

| | | | |
|---|---|---|---|
| CN | 102254563 | A | 11/2011 |
| CN | 106303837 | A | 1/2017 |
| CN | 108513214 | A | 9/2018 |
| CN | 110782911 | A | 2/2020 |
| CN | 113744750 | A | 12/2021 |
| WO | 2020178475 | A1 | 9/2020 |

* cited by examiner (a)

(b)

User screen 92

AUDIO PROCESSING METHOD AND ELECTRONIC DEVICE

CROSS-REFERENCE TO RELATED APPLICATIONS

This application is a national stage of International Application No. PCT/CN2022/094708, filed on May 24, 2022, which claims priority to Chinese Patent Application No. 202110851254.4, filed on Jul. 27, 2021, both of which are incorporated herein by references in their entireties.

TECHNICAL FIELD

This application relates to the field of audio processing technologies, and in particular, to an audio processing method and an electronic device.

BACKGROUND

As audio and video recording functions of electronic devices such as mobile phones are constantly improved, more users like to use electronic devices to record video or audio. When recording video or audio, an electronic device needs to use a microphone for sound pickup. The microphone of the electronic device can indiscriminately acquire all sound signals, including some noise, in its surrounding environment.

One type of noise is frictional sound produced by friction when a human hand (or another object) comes into contact with the microphone or a microphone pipe of the electronic device. If such noise is included in a recorded audio signal, it will cause the sound to be unclear and sharp. In addition, the noise produced by friction is input into the microphone of the electronic device after being propagated through solids, its behavior in frequency domain is different from that of other noise that is input to the electronic device after being propagated through air. As a result, it is difficult for the electronic device to accurately detect so as to suppress the noise produced by friction by using a noise reduction function available at present.

It has become an urgent problem to solve how noise produced by contact with a microphone or a microphone pipe of an electronic device in the process of recording an audio signal is removed from the audio signal.

SUMMARY

This application provides an audio processing method and an electronic device. The electronic device can determine a first noise signal in a first audio signal based on a second audio signal, and use the second audio signal to remove the first noise signal.

According to a first aspect, this application provides an audio processing method, where the method is applied to an electronic device, and the electronic device includes a first microphone and a second microphone; and the method includes: obtaining, by the electronic device at a first time point, a first audio signal and a second audio signal, where the first audio signal is used to indicate information acquired by the first microphone, and the second audio signal is used to indicate information acquired by the second microphone: determining, by the electronic device, that the first audio signal includes a first noise signal, where the second audio signal includes no first noise signal; and performing, by the electronic device, processing on the first audio signal to obtain a third audio signal, where the third audio signal includes no first noise signal: where the determining, by the electronic device, that the first audio signal includes a first noise signal includes: determining, by the electronic device according to a correlation between the first audio signal and the second audio signal, that the first audio signal includes the first noise signal.

By implementing the method of the first aspect, the electronic device can determine the first noise signal in the first audio signal based on the second audio signal and remove the first noise signal.

With reference to the first aspect, in an implementation, the first audio signal and the second audio signal correspond to N frequency points, and any one of the frequency points includes at least a frequency of a sound signal and energy of the sound signal, where N is an integer power of 2.

In the foregoing embodiment, the electronic device converts an audio signal into frequency points for processing, which can facilitate the ease of computation.

With reference to the first aspect, in an implementation, the determining, by the electronic device, that the first audio signal includes a first noise signal further includes: computing, by the electronic device by using a frame of audio signal previous to the first audio signal and a first pre-determination tag corresponding to the any one of frequency points in the first audio signal, a first tag of the any one of the frequency points in the first audio signal, where the previous frame of audio signal is an audio signal that is X frames apart from the first audio signal: the first tag is used to identify whether a first energy change value of the sound signal corresponding to the any one of the frequency points in the first audio signal conforms to a characteristic of the first noise signal: the first tag being 1 means that the sound signal corresponding to the any one of the frequency points is probably a first noise signal, and the first tag being 0 means that the sound signal corresponding to the any one of the frequency points is not a first noise signal: the first pre-determination tag is used for computing the first tag of the any one of the frequency points in the first audio signal; and the first energy difference is used to represent an energy difference between the any one of the frequency points in the first audio signal and a frequency point in the frame of audio signal previous to the first audio signal, where the frequency point in the previous frame of audio signal has the same frequency as the any one of the frequency points in the first audio signal; computing, by the electronic device, a correlation between the first audio signal and the second audio signal at any corresponding frequency point; and determining, by the electronic device according to the first tag and the correlation, all first frequency points in all the frequency points corresponding to the first audio signal, where a sound signal corresponding to the first frequency point is the first noise signal, the first tag of the first frequency point is 1, and the correlation between the first frequency point and a frequency point in the second audio signal having the same frequency as the first frequency point is less than a second threshold.

In the foregoing embodiment, the electronic device can use the previous frame of audio signal to make pre-determination on the presence of first noise signal in the current frame of first audio signal, so as to estimate, according to a characteristic that energy of the first noise signal is higher than that of other non-first noise signals, frequency points in the current frame of first audio signal that are probably first noise signals, and then according to correlations with frequency points in the second audio signal having the same frequencies as those frequency points, determine frequency points in the first audio signal that are first noise signals. Accuracy of determining first noise signals is thus improved.

With reference to the first aspect, in an implementation, before the performing, by the electronic device, processing on the first audio signal to obtain a third audio signal, the method further includes: determining, by the electronic device, whether a sound producing object is directly facing the electronic device; and the performing, by the electronic device, processing on the first audio signal to obtain a third audio signal specifically includes: when determining that the sound producing object is directly facing the electronic device, replacing, by the electronic device, the first noise signal in the first audio signal with a sound signal in the second audio signal that corresponds to the first noise signal, so as to obtain the third audio signal; and when determining that the sound producing object is not directly facing the electronic device, performing, by the electronic device, filtering on the first audio signal to remove the first noise signal therein, so as to obtain the third audio signal.

In the foregoing embodiment, if it is determined that the sound producing object is directly facing the electronic device, sound propagated arrives at the first microphone and the second microphone at the same time, which does not cause different sound energy in the first audio signal and the second audio signal, and therefore, the second audio signal can be used to replace frequency points being first noise signals in the first audio signal. If the sound producing object is not directly facing the electronic device, the second audio signal is not used to replace frequency points being first noise signals in the first audio signal. In this way, it can be ensured that a stereo audio signal can be restored based on determination of the first audio signal and the second audio signal.

With reference to the first aspect, in an implementation, the replacing, by the electronic device, the first noise signal in the first audio signal with a sound signal in the second audio signal that corresponds to the first noise signal, so as to obtain the third audio signal specifically includes: replacing, by the electronic device, the first frequency point with a frequency point, in all the frequency points corresponding to the second audio signal, that has the same frequency as the first frequency point.

In the foregoing embodiment, frequency points being first noise signals in the first audio signal are replaced with frequency points in the second audio signal having the same frequencies as the frequency points being first noise signals in the first audio signal, allowing accurate removal of frequency points being first noise signals in the first audio signal.

With reference to the first aspect, in an implementation, the determining, by the electronic device, whether a sound producing object is directly facing the electronic device specifically includes:

determining, by the electronic device, a sound source orientation of the sound producing object based on the first audio signal and the second audio signal, where the sound source orientation represents a horizontal angle between the sound producing object and the electronic device: when a difference between the horizontal angle and 90° is less than a third threshold, determining, by the electronic device, that the sound producing object is directly facing the electronic device; and when the difference between the horizontal angle and 90° is greater than the third threshold, determining, by the electronic device, that the sound producing object is not directly facing the electronic device.

In the foregoing embodiment, to determine whether the sound producing object is directly facing the electronic device, the third threshold may be 5°-10°, for example, 10°.

With reference to the first aspect, in an implementation, before the obtaining, by the electronic device, a first audio signal and a second audio signal, the method further includes: acquiring, by the electronic device, a first input audio signal and a second input audio signal, where the first input audio signal is a current frame of audio signal in time domain resulting from conversion of a sound signal acquired by the first microphone of the electronic device in a first time period; and the second audio input audio signal is a current frame of audio signal in time domain resulting from conversion of a sound signal acquired by the second microphone of the electronic device in the first time period: converting, by the electronic device, the first input audio signal to frequency domain to obtain the first audio signal; and converting, by the electronic device, the second input audio signal to frequency domain to obtain the second audio signal.

In the foregoing embodiment, the electronic device acquires the first input signal by using the first microphone and acquires the second input audio signal by using the second microphone, and converts the signals to frequency domain, thus facilitating the ease of computation and storage.

With reference to the first aspect, in an implementation, the acquiring, by the electronic device, the first input audio signal and the second input audio signal specifically includes: displaying, by the electronic device, a recording screen, where the recording screen includes a first control: detecting a first operation on the first control; and acquiring, by the electronic device in response to the first operation, the first input audio signal and the second input audio signal.

In the foregoing embodiment, the audio processing method in this embodiment of this application can be implemented in video recording.

With reference to the first aspect, in an implementation, the first noise signal is frictional sound produced by friction when a human hand or another object comes into contact with a microphone or a microphone pipe of the electronic device.

In the foregoing embodiment, the first noise signal in this embodiment of this application is frictional sound produced by friction when a human hand or another object comes into contact with a microphone or a microphone pipe of the electronic device, which is a first noise signal caused by sound propagation through solids, different from other noise signals propagated through air.

According to a second aspect, this application provides an electronic device. The electronic device includes one or more processors and a memory, where the memory is coupled to the one or more processors, the memory is configured to store computer program code, the computer program code includes computer instructions, and the one or more processors invoke the computer instructions to cause the electronic device to perform: obtaining, by the electronic device at a first time point, a first audio signal and a second audio signal, where the first audio signal is used to indicate information acquired by the first microphone, and the second audio signal is used to indicate information acquired by the second microphone: determining, by the electronic device, that the first audio signal includes a first noise signal, where the second audio signal includes no first noise signal; and performing, by the electronic device, processing on the first audio signal to obtain a third audio signal, where the third audio signal includes no first noise signal: where the determining, by the electronic device, that the first audio signal includes a first noise signal includes: determining, by the electronic device according to a correlation between the first audio signal and the second audio signal, that the first audio signal includes the first noise signal.

In the foregoing embodiment, the electronic device can determine the first noise signal in the first audio signal based on the second audio signal and remove the first noise signal.

With reference to the second aspect, in an implementation, the one or more processors are further configured to invoke the computer instructions to cause the electronic device to perform: computing, by using a frame of audio signal previous to the first audio signal and a first pre-determination tag corresponding to any one of frequency points in the first audio signal, a first tag of the any one of the frequency points in the first audio signal, where the previous frame of audio signal is an audio signal that is X frames apart from the first audio signal: the first tag is used to identify whether a first energy change value of the sound signal corresponding to the any one of the frequency points in the first audio signal conforms to a characteristic of the first noise signal; the first tag being 1 means that the sound signal corresponding to the any one of the frequency points is probably a first noise signal, and the first tag being 0 means that the sound signal corresponding to the any one of the frequency points is not a first noise signal: the first pre-determination tag is used for computing the first tag of the any one of the frequency points in the first audio signal; and the first energy difference is used to represent an energy difference between the any one of the frequency points in the first audio signal and a frequency point in the frame of audio signal previous to the first audio signal, where the frequency point in the previous frame of audio signal has the same frequency as the any one of the frequency points in the first audio signal; computing a correlation between the first audio signal and the second audio signal at any corresponding frequency point; and determining, according to the first tag and the correlation, all first frequency points in all the frequency points corresponding to the first audio signal, where a sound signal corresponding to the first frequency point is the first noise signal, the first tag of the first frequency point is 1, and the correlation between the first frequency point and a frequency point in the second audio signal having the same frequency as the first frequency point is less than a second threshold.

In the foregoing embodiment, the electronic device can use the previous frame of audio signal to make pre-determination on the presence of first noise signal in the current frame of first audio signal, so as to estimate, according to a characteristic that energy of the first noise signal is higher than that of other non-first noise signals, frequency points in the current frame of first audio signal that are probably first noise signals, and then according to correlations with frequency points in the second audio signal having the same frequencies as those frequency points, determine frequency points in the first audio signal that are first noise signals. Accuracy of determining first noise signals is thus improved.

With reference to the second aspect, in an implementation, the one or more processors are further configured to invoke the computer instructions to cause the electronic device to perform: determining whether a sound producing object is directly facing the electronic device; and the one or more processors are specifically configured to invoke the computer instructions to cause the electronic device to perform: when determining that the sound producing object is directly facing the electronic device, replacing the first noise signal in the first audio signal with a sound signal in the second audio signal that corresponds to the first noise signal, so as to obtain the third audio signal; and when determining that the sound producing object is not directly facing the electronic device, performing filtering on the first audio signal to remove the first noise signal therein, so as to obtain the third audio signal.

In the foregoing embodiment, if it is determined that the sound producing object is directly facing the electronic device, sound propagated arrives at the first microphone and the second microphone at the same time, which does not cause different sound energy in the first audio signal and the second audio signal, and therefore, the second audio signal can be used to replace frequency points being first noise signals in the first audio signal. If the sound producing object is not directly facing the electronic device, the second audio signal is not used to replace frequency points being first noise signals in the first audio signal. In this way, it can be ensured that a stereo audio signal can be restored based on determination of the first audio signal and the second audio signal.

With reference to the second aspect, in an implementation, the one or more processors are specifically configured to invoke the computer instructions to cause the electronic device to perform: replacing the first frequency point with a frequency point, in all the frequency points corresponding to the second audio signal, that has the same frequency as the first frequency point.

In the foregoing embodiment, frequency points being first noise signals in the first audio signal are replaced with frequency points in the second audio signal having the same frequencies as the frequency points being first noise signals in the first audio signal, allowing accurate removal of frequency points being first noise signals in the first audio signal.

With reference to the second aspect, in an implementation, the one or more processors are further configured to invoke the computer instructions to cause the electronic device to perform: determining a sound source orientation of the sound producing object based on the first audio signal and the second audio signal, where the sound source orientation represents a horizontal angle between the sound producing object and the electronic device: when a difference between the horizontal angle and 90° is less than a third threshold, determining, by the electronic device, that the sound producing object is directly facing the electronic device; and when the difference between the horizontal angle and 90° is greater than the third threshold, determining that the sound producing object is not directly facing the electronic device.

In the foregoing embodiment, to determine whether the sound producing object is directly facing the electronic device, the third threshold may be 5°-10°, for example, 10°.

With reference to the second aspect, in an implementation, the one or more processors are further configured to invoke the computer instructions to cause the electronic device to perform: acquiring a first input audio signal and a second input audio signal, where the first input audio signal is a current frame of audio signal in time domain resulting from conversion of a sound signal acquired by the first microphone of the electronic device in a first time period; and the second audio input audio signal is a current frame of audio signal in time domain resulting from conversion of a sound signal acquired by the second microphone of the electronic device in the first time period: converting the first input audio signal to frequency domain to obtain the first audio signal; and converting the second input audio signal to frequency domain to obtain the second audio signal.

In the foregoing embodiment, the electronic device acquires the first input signal by using the first microphone and acquires the second input audio signal by using the second microphone, and converts the signals to frequency domain, thus facilitating the ease of computation and storage.

With reference to the second aspect, in an implementation, the one or more processors are further configured to invoke the computer instructions to cause the electronic device to perform: displaying a recording screen, where the recording screen includes a first control: detecting a first operation on the first control; and acquiring, in response to the first operation, the first input audio signal and the second input audio signal.

In the foregoing embodiment, the audio processing method in this embodiment of this application can be implemented in video recording.

According to a third aspect, this application provides an electronic device, where the electronic device includes one or more processors and a memory: the memory is coupled to the one or more processors: the memory is configured to store computer program code: the computer program code includes computer instructions; and the one or more processors invoke the computer instructions to cause the electronic device to perform the method according to any one of the first aspect or the implementations of the first aspect.

In the foregoing embodiment, the electronic device can determine the first noise signal in the first audio signal based on the second audio signal and remove the first noise signal.

According to a fourth aspect, this application provides a system on chip, where the system on chip is applied to an electronic device, the system on chip includes one or more processors, and the one or more processors are configured to invoke computer instructions to cause the electronic device to perform the method according to any one of the first aspect or the implementations of the first aspect.

In the foregoing embodiment, the electronic device can determine the first noise signal in the first audio signal based on the second audio signal and remove the first noise signal.

According to a fifth aspect, an embodiment of this application provides a computer program product. When the computer program product is run on an electronic device, the electronic device is enabled to perform the method according to any one of the possible implementations of the first aspect.

In the foregoing embodiment, the electronic device can determine the first noise signal in the first audio signal based on the second audio signal and remove the first noise signal.

According to a sixth aspect, an embodiment of this application provides a computer readable storage medium, including computer instructions. When the computer instructions are run on an electronic device, the electronic device is enabled to perform the method according to any one of the possible implementations of the first aspect.

In the foregoing embodiment, the electronic device can determine the first noise signal in the first audio signal based on the second audio signal and remove the first noise signal.

Figure 10:
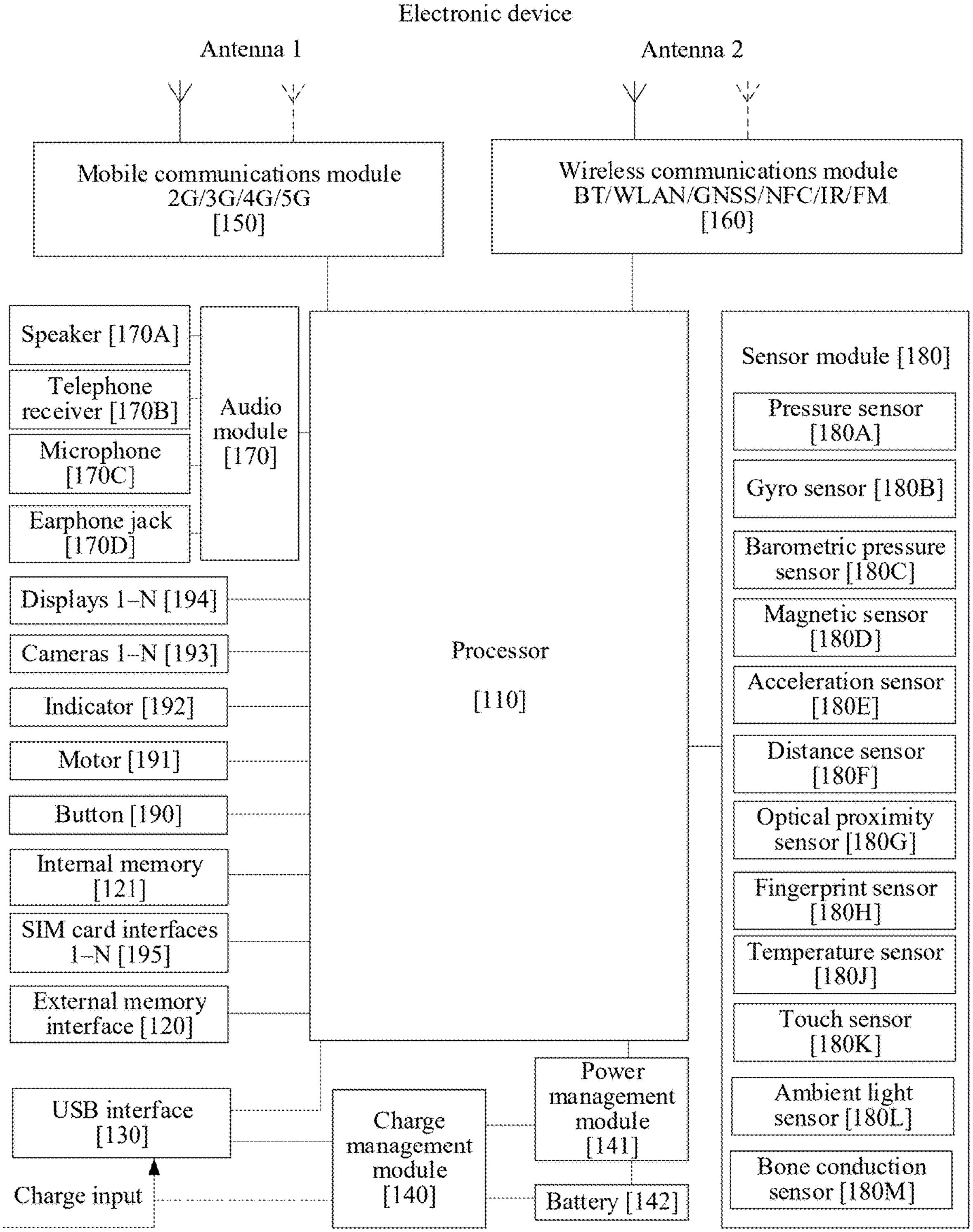

FIG. *8a* and FIG. *8b* are a set of illustrative user screens of processing an audio signal in real time by using the audio processing method of this application:

FIG. *9a* to FIG. *9c* are a set of illustrative user screens of post-processing an audio signal by using the audio processing method of this application; and FIG. 10 is a schematic structural diagram of an electronic device 100 according to an embodiment of this application.

DESCRIPTION OF EMBODIMENTS

Terms used in the following embodiments of this application are merely intended for a purpose of describing particular embodiments, and are not intended for limiting this application. As used in the specification and the appended claims of this application, singular expressions such as “a”, “an”, “the”, “the foregoing”, “that”, and “this” are intended to also include plural expressions, unless otherwise expressly specified in the context. It should also be understood that, as used in this application, the term “and/or” refers to and includes any and all possible combinations of one or more of the listed items.

In addition, the terms “first” and “second” are merely intended for a purpose of description, and shall not be understood as any suggestion or implication of relative importance or any implicit indication of the quantity of the indicated technical feature. Therefore, a feature limited by “first” or “second” may explicitly or implicitly include one or more features. In the description of the embodiments of this application, “a plurality of” means two or more than two, unless otherwise specified.

For ease of understanding, the following first describes related terms and concepts used in the embodiments of this application.

(1) Microphone

A microphone (microphone) of an electronic device is also called a mic, mike, or mouthpiece. The microphone is used to acquire a sound signal in a surrounding environment of the electronic device, convert the sound signal into an electrical signal, and then perform a series of processing such as analog-to-digital conversion on the electrical signal to obtain an audio signal in a digital form that is processable by a processor of the electronic device.

In some embodiments, the electronic device may be provided with at least two microphones, which can implement functions such as noise reduction and sound source identification in addition to sound signal acquirement.

Figure 1:
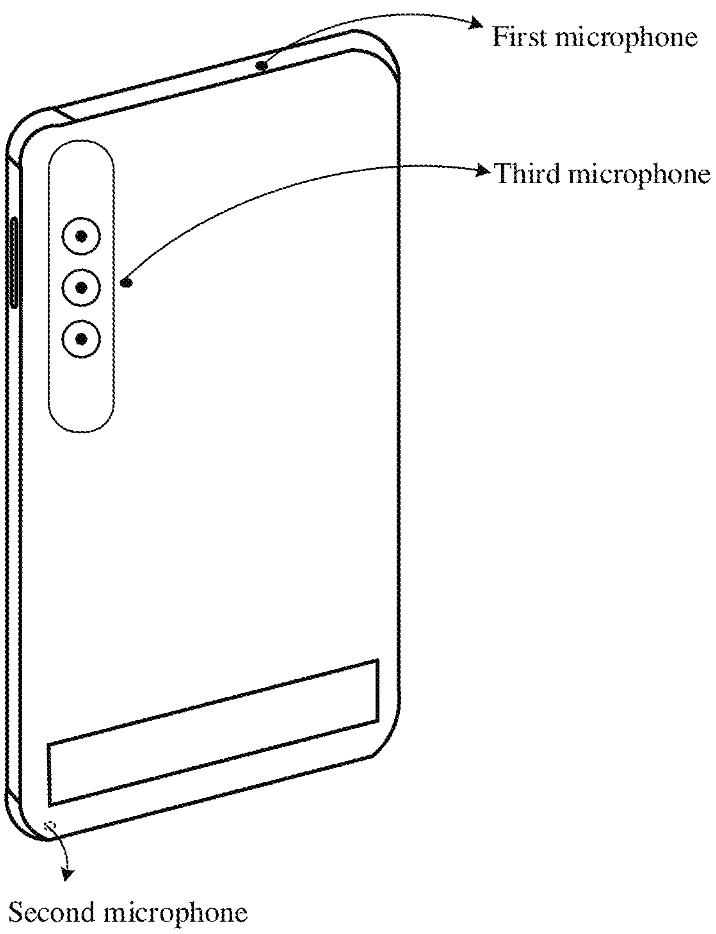
FIG. 1 is a schematic diagram of an electronic device equipped with three microphones according to an embodiment of this application.

FIG. 1 is a schematic diagram of an electronic device equipped with three microphones.

As shown in FIG. 1, the electronic device may include three microphones, where the three microphones are a first microphone, a second microphone, and a third microphone. The first microphone may be arranged on the top of the electronic device. The second microphone may be arranged on the bottom of the electronic device. The third microphone may be arranged on the back of the electronic device.

It should be understood that FIG. 1 is a schematic diagram showing the number and distribution of microphones in the electronic device, which should not constitute any limitation on the embodiments of this application. In other embodiments, the electronic device may have more or fewer microphones than shown in FIG. 1, and their distribution may be different from that shown in FIG. 1.

(2) Spectrogram

Spectrogram is used to represent audio signals in frequency domain which may be obtained through conversion of audio signals in time domain.

It should be understood that when the electronic device acquires an audio signal, sound signals acquired by the first microphone and the second microphone are the same, that is, they have the same sound source.

If the part of audio signal acquired by the two microphones in the same time period or at the same time point does not include noise produced by friction, spectrograms corresponding to that part of audio signal as acquired by the two microphones are similar in pattern. If the two spectrograms are similar, a higher correlation is present between same frequency points in the spectrograms.

However, in the same time period or at the same time point, a spectrogram corresponding to the part of sound signal acquired by one microphone with noise produced by friction is not similar in pattern to a spectrogram corresponding to the part of sound signal acquired by the other microphone without noise produced by friction. If the two spectrograms are not similar, a lower correlation is present between same frequency points in the spectrograms.

Figure 2:
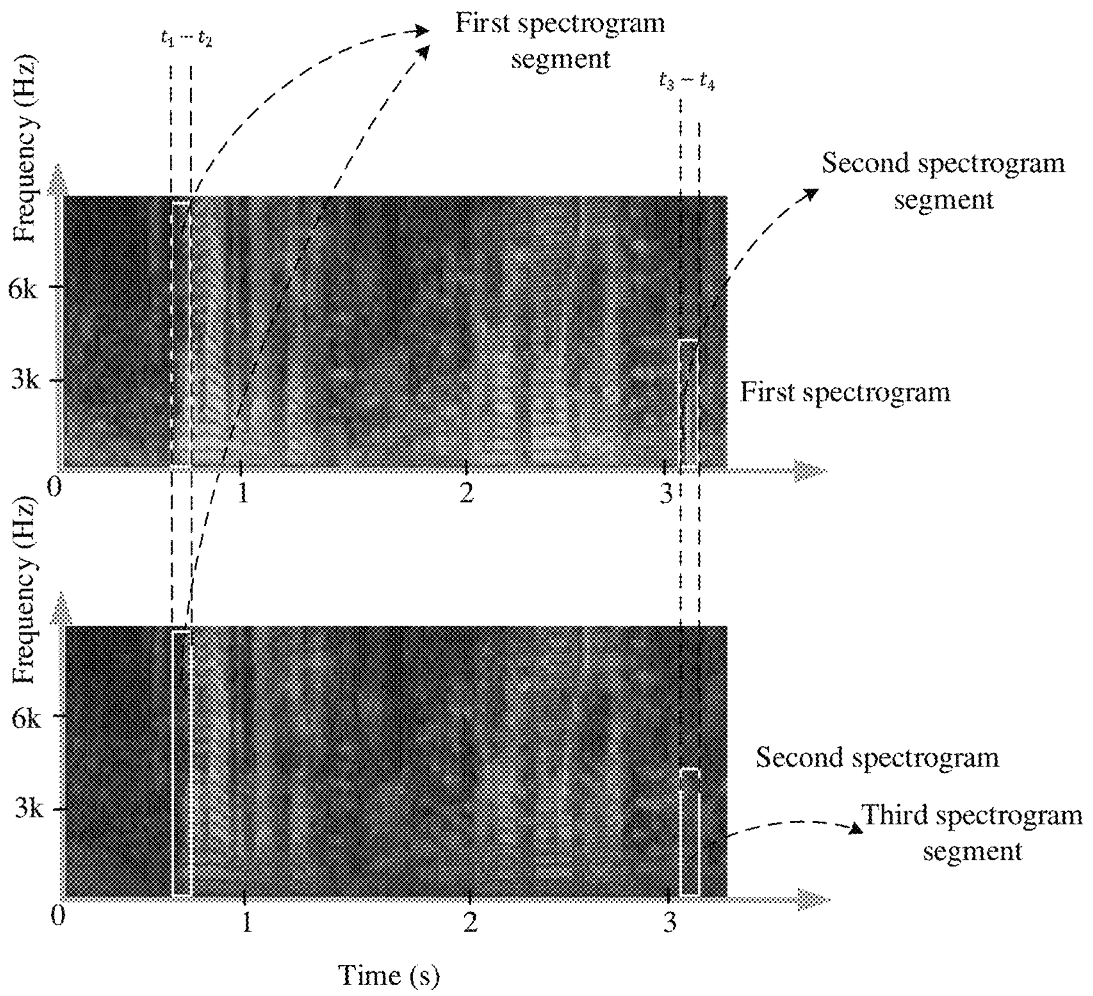
FIG. 2 shows illustrative spectrograms of two audio signals.

FIG. 2 shows illustrative spectrograms of two audio signals.

In FIG. 2, a first spectrogram represents an audio signal in frequency domain resulting from conversion of a sound signal acquired by the first microphone, and a second spectrogram represents an audio signal in frequency domain resulting from conversion of a sound signal acquired by the second microphone.

The abscissas of the first spectrogram and the second spectrogram represent time, and the ordinates thereof represent frequency. Every point may be called a frequency point. Brightness of color of each frequency point represents energy of an audio signal at that frequency at that time. The unit of energy is decibel (decibel, dB), which indicates amplitude of audio data corresponding to the frequency point in decibels.

In a time period of $t_1$-$t_2$, as shown in the figure, a first spectrogram segment in the first spectrogram and a first spectrogram segment in the second spectrogram are spectrogram segments corresponding to the part of sound signal without noise produced by friction.

It can be seen that the first spectrogram segment in the first spectrogram is similar in pattern to the first spectrogram segment in the second spectrogram, where frequency points are distributed in similar patterns: on the horizontal axis, energy changes continuously over consecutive frequency points and fluctuates, and the energy is relatively high. It can be seen from the first spectrogram and the second spectrogram that brightnesses of frequency points are different. This is because the first microphone and the second microphone are in different locations, and when a sound signal is input into the two microphones after being propagated through air, its amplitude in decibels varies. More decibels mean higher brightness and fewer decibels mean lower brightness.

In the time period of $t_3$-$t_4$, as shown in the figure, the second spectrogram segment in the first spectrogram is a spectrogram segment corresponding to the part of sound signal with noise produced by friction as a result of a user rubbing against the first microphone which makes noise produced by friction present in the audio signal acquired by the first microphone.

In the time period of $t_3$-$t_4$, as shown in the figure, a third spectrogram segment in the second spectrogram is a spectrogram segment corresponding to the part of sound signal acquired by the second microphone, where the part of sound signal acquired by the second microphone includes no noise produced by friction.

It can be seen that the second spectrogram segment is not similar to the third spectrogram segment: in the second spectrogram segment, in the part of spectrogram segment corresponding to noise produced by friction, on the horizontal axis, energy changes continuously over consecutive frequency points but does not fluctuate, showing that the energy is changing in a small range, but the energy is greater than that of other audio signals nearby. The third spectrogram segment, however, does not exhibit such pattern.

In a solution, the electronic device classifies as noise frictional sound produced by friction when a human hand (or another object) comes into contact with a microphone or a microphone pipe of the electronic device and handles all noise together. In a common handling method, for an audio signal resulting from conversion of a sound signal acquired by the microphone, the electronic device may detect noise in the audio signal based on different spectrogram patterns of noise and a normal audio signal, and filter the audio signal to remove the noise in the audio signal, where the noise also includes such frictional sound as produced by friction when a human hand (or another object) comes into contact with the microphone of the electronic device. This method can suppress the noise produced by friction to some extent.

However, because the noise produced by friction is input into the microphone of the electronic device after being propagated through solids, its behavior in frequency domain is different from that of other noise that is input to the electronic device after being propagated through air. As a result, it is difficult for the electronic device to accurately detect so as to suppress the noise produced by friction by using a noise reduction function available at present.

Figure 3:
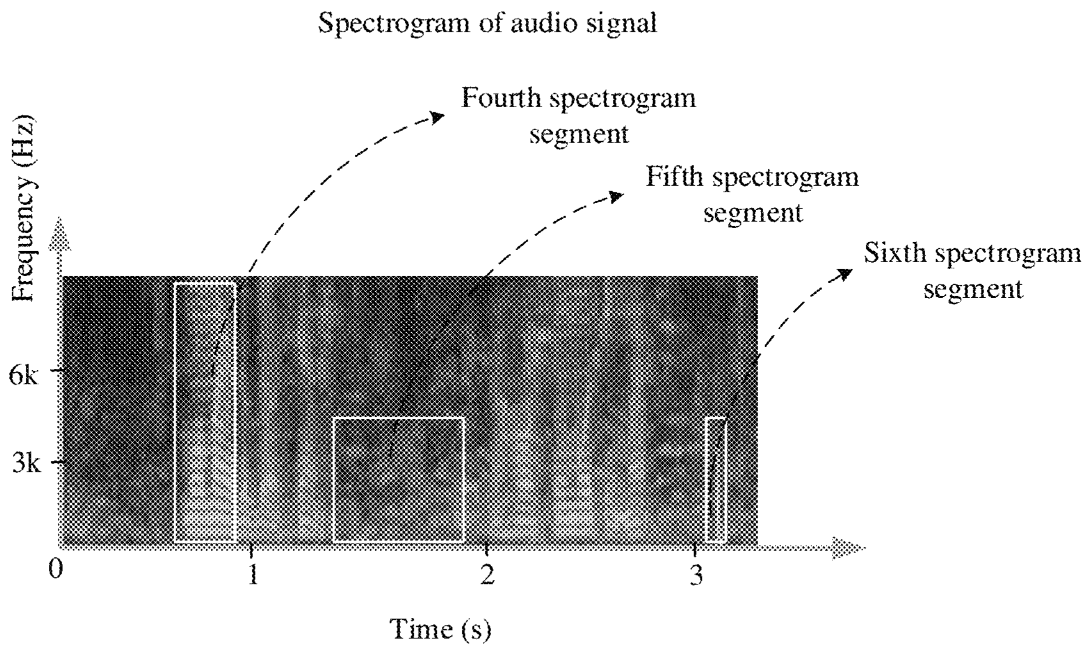
FIG. 3 shows an illustrative spectrogram of one audio signal.

FIG. 3 is an illustrative spectrogram of one audio signal.

A spectrogram corresponding to a normal audio signal may be as shown in a fourth spectrogram segment, where on the horizontal axis, energy changes continuously over consecutive frequency points and fluctuates, and the energy is relatively high. A spectrogram corresponding to noise produced by friction may be as shown in a fifth spectrogram segment, where on the horizontal axis, energy changes continuously over consecutive frequency points but does not fluctuate, showing that the energy is changing in a small range, but the energy is greater than that of other audio signals nearby. A spectrogram corresponding to other noise may be as shown in a sixth spectrogram segment, which shows that energy changes discontinuously and the energy is relatively low:

Because noise produced by friction behaves differently from other noise in an audio signal in frequency domain, it is difficult for the electronic device to accurately detect so as to suppress the noise produced by friction by using a filtering algorithm for removing other noise.

In the embodiments of this application, the electronic device can detect and suppress noise produced by friction in an audio signal, so as to reduce impact of the noise on audio quality.

For ease of description, the noise produced by friction may be referred to as a first noise signal below.

The first noise signal is frictional sound produced by friction when a human hand (or another object) comes into contact with the microphone or a microphone pipe of the electronic device. If such noise is included in a recorded audio signal, it will cause the sound to be unclear and sharp. In addition, the noise produced by friction is input into the microphone of the electronic device after being propagated through solids, its behavior in frequency domain is different from that of other noise that is input to the electronic device after being propagated through air. For a scenario where the first noise signal is produced, reference may be made to the following description of FIG. 4, which is not described right now:

The audio processing method in the embodiments of this application may be used for audio signal processing when an electronic device records video or audio.

Figure 4:
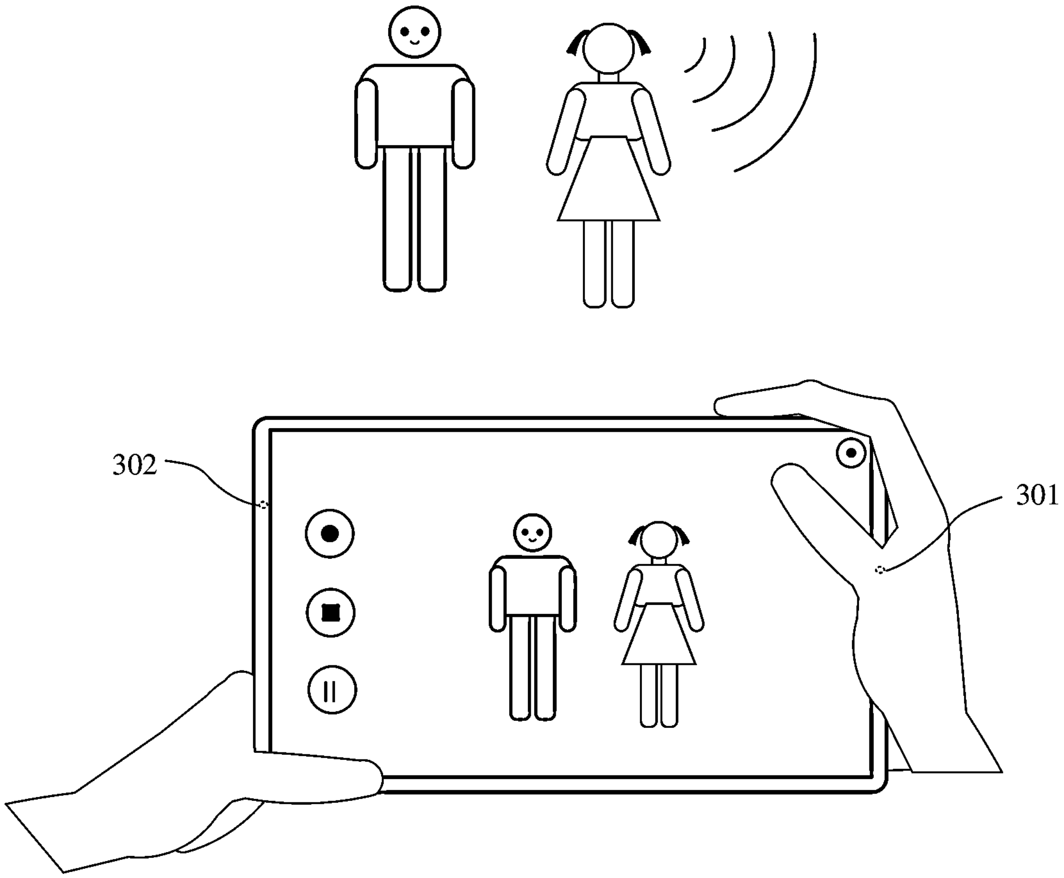
FIG. 4 shows a possible use case of an embodiment of this application.

FIG. 4 shows a possible use case of an embodiment of this application.

It should be understood that when designing distribution of microphones, to prevent two microphones from contacting a user at the same time, a manufacturer considers where the microphones should be distributed in an electronic device under the assumption that the user is in a best posture of firmly holding the electronic device. Therefore, when recording video with the electronic device, to hold the electronic device firmly, the user generally does not contact all the microphones of the electronic device at the same time, unless intentionally:

For example, as shown in FIG. 4, the electronic device is recording a video, and one hand of the user blocks a first microphone but does not block a second microphone 302 of the electronic device. In this case, the hand of the user may rub against the first microphone 301 to produce a first noise signal in a recorded audio signal. However, in this case, no first noise signal is present in an audio signal recorded by the second microphone.

Reference is made to the foregoing description of term (2). The electronic device may utilize a characteristic that the part of spectrogram corresponding to the first noise signal in the audio signal recorded by the first microphone is not similar to the part of spectrogram corresponding to the audio signal recorded by the second microphone in the same time period or at the same time point, for example, the second spectrogram segment in the first spectrogram shown in FIG. 2 is not similar to the third spectrogram segment in the second spectrogram. Then, the electronic device can detect and suppress the first noise signal in the audio signal recorded by the first microphone so as to reduce impact of the noise on audio quality.

The following describes in detail an audio processing method provided in the embodiments of this application.

In the embodiments of this application, at least two microphones of an electronic device can continuously acquire sound signals, convert the sound signals in real time into audio signals of a current frame, and perform real-time processing on the audio signals. For a current frame of first input audio signal acquired by a first microphone, the electronic device can detect a first noise signal in the first input audio signal based on a current frame of second input audio signal acquired by the second microphone and remove the first noise signal. The second microphone may be any microphone in the electronic device other than the first microphone.

Figure 5:
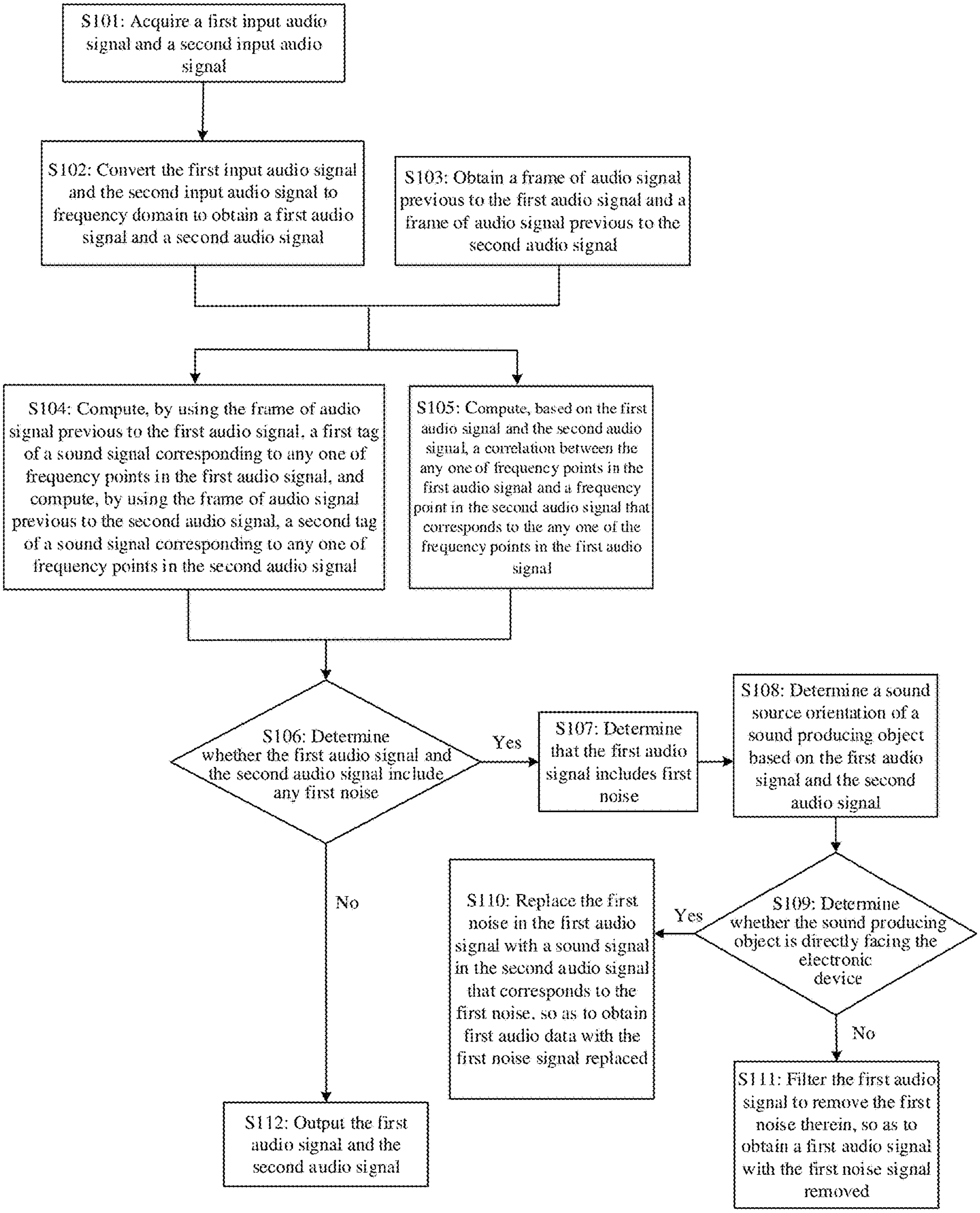
FIG. 5 is a schematic flowchart of an audio processing method according to an embodiment of this application.

FIG. 5 is a schematic flowchart of an audio processing method according to an embodiment of this application.

For noise reduction processing performed by the electronic device on a first input audio signal and a first noise signal in a second input audio signal, reference may be made to the following descriptions of step S101 to step S112.

S101: The electronic device acquires the first input audio signal and the second input audio signal.

The first input audio signal is a current frame of audio signal in time domain resulting from convention of a sound signal acquired by the first microphone of the electronic device in a first time period. The second input audio signal is a current frame of audio signal resulting from convention of a sound signal acquired by the second microphone of the electronic device in the first time period.

The first time period is a very short period of time, that is, a time corresponding to acquisition of one frame of audio signal. A specific length of the first time period may be determined depending on a processing capability of the electronic device, and typically may range from 10 ms to 50 ms, for example, a multiple of 10 ms such as 10 ms, 20 ms, or 30 ms.

An example is used that the electronic device acquires the first input audio signal.

Specifically, in the first time period, the first microphone of the electronic device may acquire a sound signal and convert the sound signal into an analog electrical signal. The electronic device then samples the analog electrical signal and converts the analog electrical signal to an audio signal in time domain. The audio signal in time domain is a digital audio signal consisting of W sample points of the analog electrical signal. In the electronic device, an array may be used to represent the first input audio signal. Any element in the array is used to represent one sample point, and any element includes two values, of which one represents a time and the other represents an amplitude of an audio signal corresponding to the time, where the amplitude is used to represent a voltage corresponding to the audio signal.

In some embodiments, the first microphone is any microphone of the electronic device, and the second microphone may be any microphone other than the first microphone.

In other embodiments, the second microphone may be a microphone closest to the first microphone in the electronic device.

It can be understood that, for the process of acquiring the second input audio signal by the electronic device, reference may be made to the descriptions of the first input audio signal, and details are not repeated herein.

S102: The electronic device converts the first input audio signal and the second input audio signal to frequency domain to obtain a first audio signal and a second audio signal.

The first audio signal is the current frame of audio signal acquired by the electronic device.

Specifically, the electronic device converts the first input audio signal in time domain to an audio signal in frequency domain as the first audio signal. The first audio signal may be represented as N (N is an integer power of 2) frequency points. For example, N may be 1024, 2048, or the like, and the specific value of N may depend on a computing capability of the electronic device. The N frequency points are used to represent audio signals within a specific frequency range, for example, the range of 0 KHz to 6 KHz or other frequency ranges. It can also be understood that the frequency point refers to information of the first audio signal at a corresponding frequency, including information such as time, frequency of a sound signal, and energy (in decibels) of the sound signal.

Figure 6:
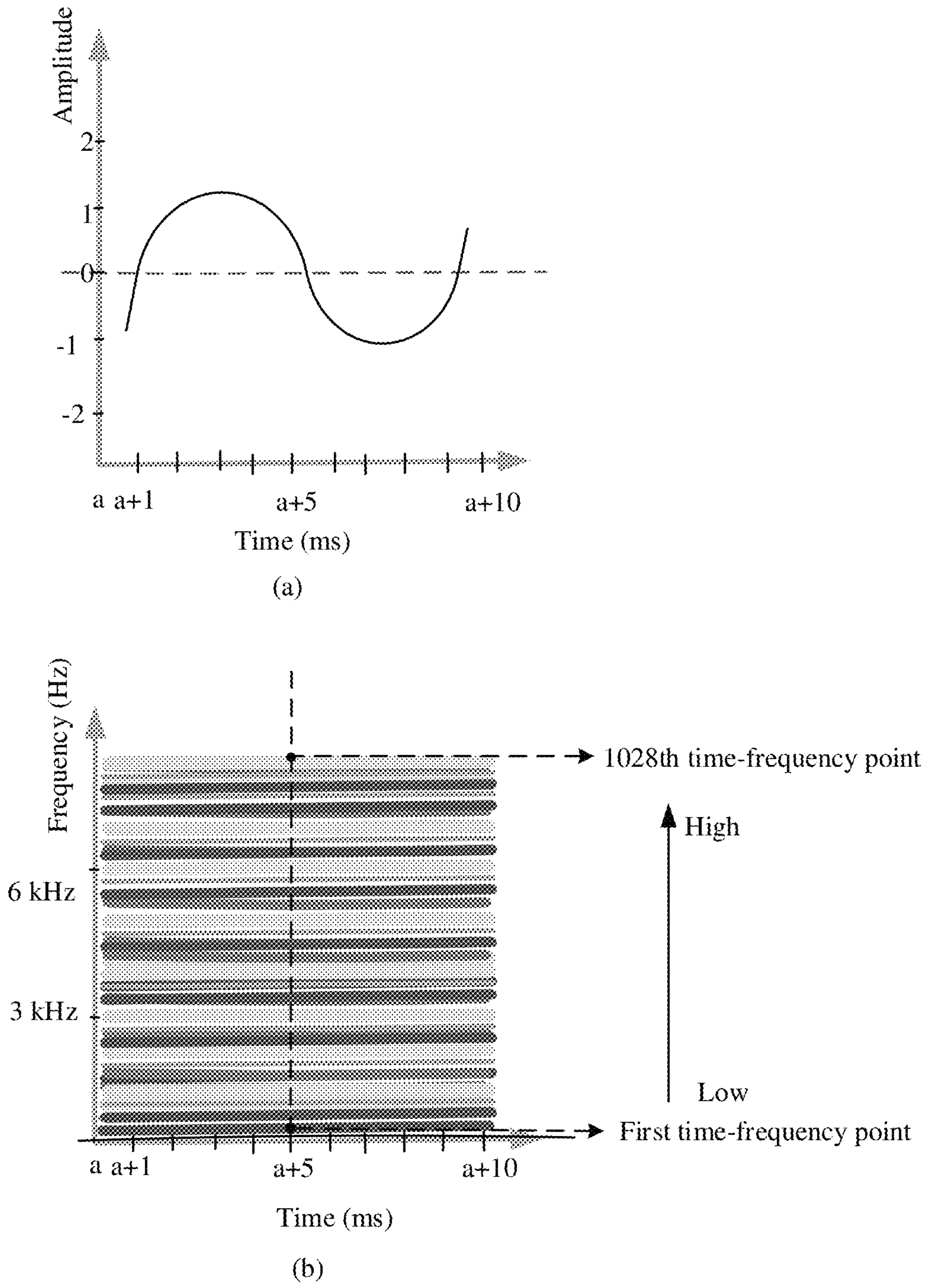
FIG. 6 is a schematic diagram of an audio signal and a first audio signal in a period from a (ms) to a+10 (ms) in time domain according to an embodiment of this application.

(a) in FIG. 6 is a schematic diagram of the first input audio signal in a period from a (ms) to a+10 (ms) in time domain.

The audio signal in the period from a (ms) to a+10 (ms) in time domain may represent an audio waveform shown in (a) in FIG. 6, where the abscissa of the audio waveform represents time, and the ordinate of the audio waveform represents voltage corresponding to the audio signal.

Then, the electronic device may convert the audio signal in time domain to frequency domain through discrete fourier transform (discrete fourier transform, DFT). The electronic device may convert, through 2N-point DFT, the audio signal in time domain to a first audio signal corresponding to N frequency points.

N is an integer power of 2, and the value of N is determined by a computing capability of the electronic device. A higher processing speed of the electronic device may correspond to a larger value of N.

This embodiment of this application is explained by using an example that the electronic device converts, through 2048-point DFT, the audio signal in time domain to a first audio signal corresponding to 1024 frequency points. The value of 1024 is merely an example, and other values such as 2048 may alternatively be used in other embodiments, provided that N is an integer power of 2. This is not limited in the embodiments of this application.

(b) in FIG. 6 is a schematic diagram of the first audio signal.

This figure is a spectrogram of the first audio signal. The abscissa represents time, and the ordinate represents frequency of the sound signal. At one time point, 1024 frequency points of different frequencies are included in total. For ease of presentation, each frequency point is represented by a straight line, where any frequency point in the straight line can represent a frequency point at a different time at this frequency. A brightness of each frequency point represents energy of a sound signal corresponding to the frequency point.

The electronic device may select 1024 frequency points of different frequencies corresponding to a given time point in the first time period to represent the first audio signal, and this time point is also called a time frame, that is, a processed frame of audio signal.

For example, the first audio signal may be represented by 1024 frequency points of different frequencies corresponding to a middle time point, that is, time point a+5 (ms). For example, the first frequency point and the 1024th frequency point may be frequency points corresponding to the same time and two different frequencies. Among the 1024 frequency points corresponding to the first audio signal, the frequency changes from low to high from the first frequency point to the 1024th frequency point.

It should be understood that the electronic device converts the second input audio signal in time domain to an audio signal in frequency domain as the second audio signal.

For the process of obtaining the second audio signal by the electronic device, reference may be made to the foregoing description of obtaining the first audio signal, and further description is not given herein.

S103: The electronic device obtains a frame of audio signal previous to the first audio signal and a frame of audio signal previous to the second audio signal.

The frame of audio signal previous to the first audio signal may alternatively be an audio signal that is X frames apart from the first audio signal. X may take a value in the range of 1 to 5. In this embodiment of this application, X is 2, and the frame of audio signal previous to the first audio signal is an audio signal one frame apart from the first audio signal. That is, a difference between the time of acquiring the first audio signal by the electronic device and the time of acquiring the previous frame of audio signal by the electronic device is Δt, where Δt is a length of the foregoing first time period. For example, duration of each frame being 10 ms is used as an example. The first audio signal is an audio signal in a time period from 50 ms to 60 ms, the previous frame of audio signal is an audio signal in a time period from 30 ms to 40 ms, and Δt=10 ms.

The frame of audio signal previous to the second audio signal may be an audio signal that is X frames apart from the second audio signal. The value of this X is the same as X in the case of the frame of audio signal previous to the first audio signal, and reference may be made to the foregoing descriptions. Details are not repeated herein.

S104: The electronic device computes, by using the frame of audio signal previous to the first audio signal, a first tag of a sound signal corresponding to any one of frequency points in the first audio signal, and computes, by using the frame of audio signal previous to the second audio signal, a second tag of a sound signal corresponding to any one of frequency points in the second audio signal.

The first tag is used to identify whether a first energy change value of the sound signal corresponding to the any one of the frequency points in the first audio signal conforms to a characteristic of a first noise signal. The first tag of the any one of the frequency points is 0 or 1. The first tag being 0 indicates that the first energy change value of the frequency point does not conform to the characteristic of the first noise signal and that the frequency point is not a first noise signal. The first tag being 1 indicates that the first energy change value of the frequency point conforms to the characteristic of the first noise signal and that the frequency point is probably a first noise signal. In this case, the electronic device may further determine, based on a correlation between the frequency point and a frequency point in the second audio signal having the same frequency as that frequency point, whether the frequency point is a first noise signal.

For the process of computing by the electronic device a correlation between the frequency point and a frequency channel in the second audio signal having the same frequency as that frequency channel, reference may be made to the following description of step S105. Details are not described right now: For the process that the electronic device further determines through computation whether the frequency point is a first noise signal, reference may be made to the following description of step S106. Details are not described right now:

The first energy change value is used to represent an energy difference between the any one of the frequency points in the current frame of first audio signal and a frequency point in the frame of audio signal previous to the first audio signal having the same frequency as the first audio signal. The previous frame of audio signal may be a frame of audio signal that is apart from the first audio signal by X times Δt in acquisition time, for example, by Δt. Δt represents a length of the first time period. When X=1, the first energy change value is used to represent an energy difference between the any one of the frequency points in the first audio signal and another frequency point having the same frequency as but being Δt apart in time from that frequency point. When X=2, the first energy change value is used to represent an energy difference between the any one of the frequency points in the first audio signal and another frequency point having the same frequency as but being 2Δt apart in time from that frequency point. The value of X may alternatively be another integer. This is not limited in the embodiments of this application. For the process of computing the first energy change value by the electronic device, reference may be made to the following descriptions. Details are not described right now.

When computing a first tag of any one of frequency points in all audio signals (including the first audio signal) acquired by the first microphone, the electronic device may further set N pre-determination tags, where N is the total number of frequency points in an audio signal. Any one of the pre-determination tags is used for computing the first tag of any one of the frequency points having the same frequency in all the audio signals, and an initial value of the N pre-determination tags is 0. To be specific, any one of the frequency points corresponds to one pre-determination tag, and all frequency points having the same frequency correspond to the same pre-determination tag.

When computing the first tag of any one of the frequency points in the first audio signal, the electronic device first acquires a first pre-determination tag, where the first pre-determination tag is a pre-determination tag corresponding to the frequency point.

When the value of the first pre-determination tag is 0, and the first energy change value of the any one of the frequency points in the first audio signal is greater than a first threshold, the electronic device sets the value of the first pre-determination tag to 1 and sets the first tag of the frequency point to the value of the first pre-determination tag, that is, 1. When the value of the first pre-determination tag is 0, and the first energy change value of the any one of the frequency points in the first audio signal is less than or equal to the first threshold, the electronic device keeps the value 0 of the first pre-determination tag unchanged and sets the first tag of the frequency point to the value of the first pre-determination tag, that is, 0.

When the value of the first pre-determination tag is 1, and the first energy change value of the any one of the frequency points in the first audio signal is greater than the first threshold, the electronic device sets the value of the first pre-determination tag to 0 and sets the first tag of the frequency point to the value of the first pre-determination tag, that is, 0. When the value of the first pre-determination tag is 1, and the first energy change value of the any one of the frequency points in the first audio signal is less than or equal to the first threshold, the electronic device keeps the value 1 of the first pre-determination tag unchanged and sets the first tag of the frequency point to the value of the first pre-determination tag, that is, 1.

Figure 7:
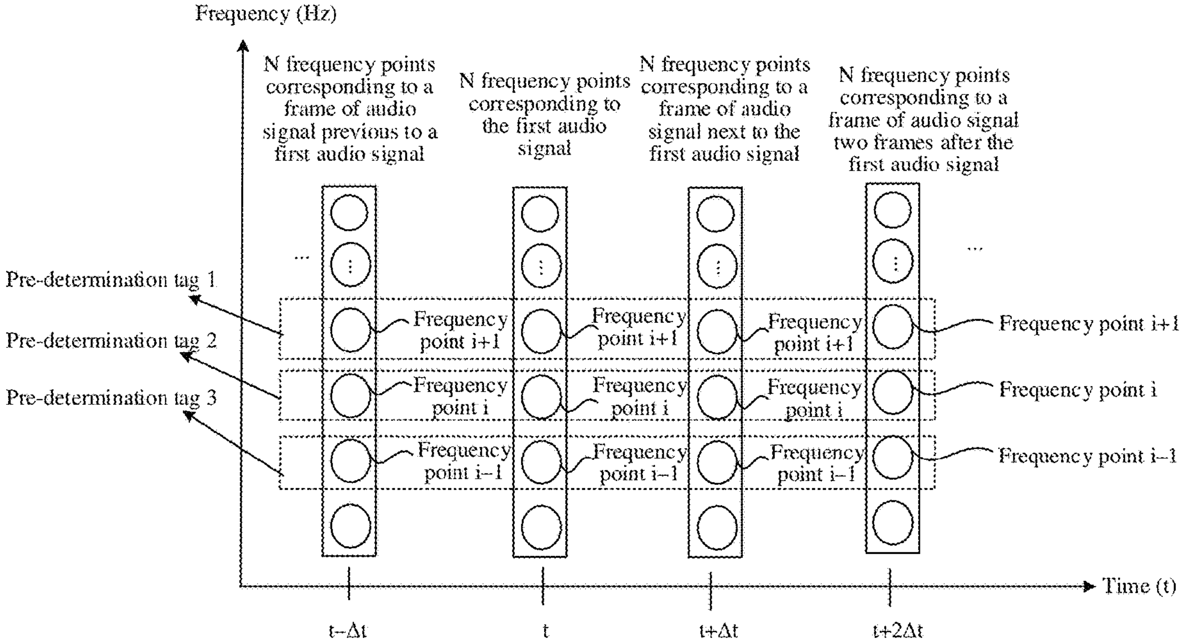
FIG. 7 is a schematic diagram of computing a first tag of a frequency point by an electronic device.
Figure 7:
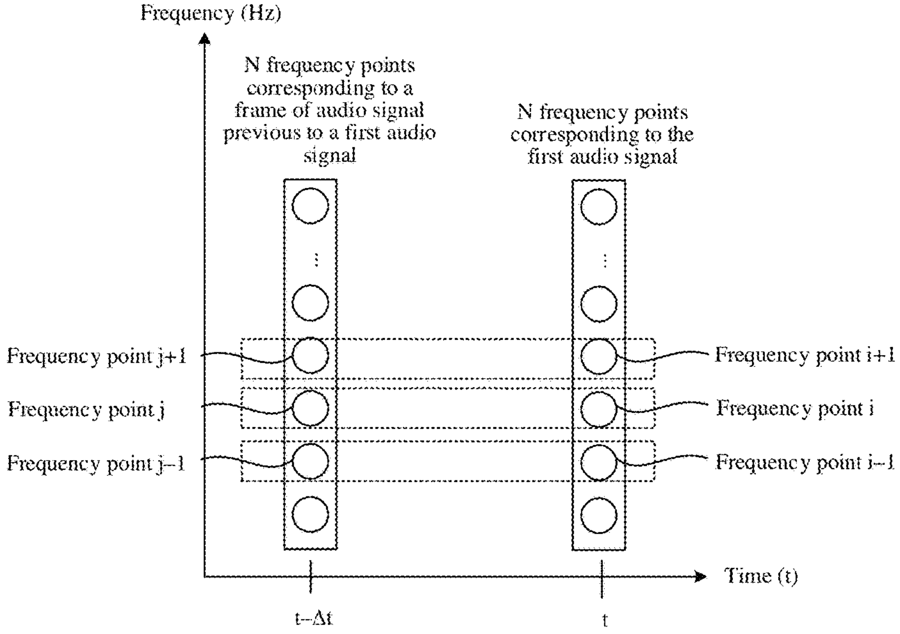

FIG. 7 is a schematic diagram of computing the first tag of the frequency point by the electronic device.

As shown in (a) of FIG. 7, four frequency points i+1 are frequency points having the same frequency, and the four frequency points i+1 correspond to pre-determination tag 1. Four frequency points i are frequency points having the same frequency, and the four frequency points i correspond to pre-determination tag 2. Four frequency points i−1 are frequency points having the same frequency, and the four frequency points i−1 correspond to pre-determination tag 2.

It is assumed that the pre-determination tag 2 of the frequency point i at a time point t−Δt is equal to 0 as computed. When a first energy change value of the frequency point i at a time point t is greater than the first threshold, the electronic device sets the pre-determination tag 2 to 1 and sets the first tag of the frequency point i at the time point t to the value of the pre-determination tag 2, that is, 1. When the first energy change value of the frequency point i at a time point t+Δt is less than the first threshold, the electronic device sets the pre-determination tag 2 to 1 and sets the first tag of the frequency point i at the time point t+Δt to the value of the pre-determination tag 2, that is, 1. When the first energy change value of the frequency point i at a time point t+2Δt is greater than the first threshold, the electronic device sets the pre-determination tag 2 to 1 and sets the first tag of the frequency point i at the time point t+2Δt to the value of the pre-determination tag 2, that is, 1. Therefore, the sound signal corresponding to frequency point i at a time point t−Δt is not a first noise signal, the sound signal corresponding to frequency point i at the time point t and the time point t+Δt is probably a first noise signal, and the sound signal corresponding to frequency point i at the time point t+2Δt is probably not a first noise signal.

Based on the sound signal acquired in the time period $t_3$-$t_4$ as in FIG. 2 and the relevant descriptions of (a) in FIG. 7, it can be learned that, if energy of a frequency point increases with respect to a frequency point of the frame of audio signal previous to the frequency point having the same frequency as that frequency point, with an amount of increase exceeding the first threshold, it indicates that the first noise signal is probably beginning to take presence, and M consecutive frequency points following the frequency point are probably first noise signals, for which the first energy change value is less than or equal to the first threshold. If there is another frequency point, and energy of which decreases with respect to a frequency point in a frame of audio signal previous to that frequency point having the same frequency as the frequency point, with an amount of decrease exceeding the first threshold, it indicates that the first noise signal disappears for now: The electronic device may determine that sound signals corresponding to the consecutive M frequency points are all first noise signals.

The first threshold is chosen based on experience, and the embodiments of this application impose no limitation thereon.

In this way, the electronic device can determine frequency points in the audio signal that are probably first noise signals.

For the process of computing the first energy change value of any one of the frequency points by the electronic device, reference may be made to the following descriptions.

In some embodiments, to enhance stability of the first energy change value computed, the first energy change value of the sound signal corresponding to any one of the frequency points in the first audio signal also includes an energy difference between two frequency points before and after the frequency point that have the same time as but different frequencies from the frequency point.

In this case, an equation for computing the first energy change value of the sound signal corresponding to any one of the frequency points in the first audio signal by the electronic device is as follows:

$$\Delta A(t,f)=|w_1[A(t,f-1)-A(t-\Delta t,f-1)]+w_2[A(t,f)-A(t-\Delta t,f)]+w_3[A(t,f+1)-A(t-\Delta t,f+1)]|$$

This equation is introduced with reference to (b) in FIG. 7. In the equation, ΔA(t, f) represents a first energy change value of the sound signal corresponding to any one (for example, frequency point i in (b) in FIG. 7) of the frequency points in the first audio signal. A(t, f−1) represents energy of a previous frequency point (for example, frequency point i−1 in (b) in FIG. 7) having the same time as the any one of the frequency points. A(t−Δt, f−1) represents energy of a frequency point (for example, frequency point j−1 in (b) in FIG. 7) that is $\Delta t$ apart in time from but has the same frequency as the previous frequency point. Therefore, A(t, f−1)−Δ(t−Δt, f−1) represents an energy difference corresponding to a previous frequency point having the same time as but a different frequency from the any one of the frequency points, and $w_1$ represents a weight of this energy difference. Δ(t, f) represents the energy of the any one of the frequency points. Δ(t−Δt, f) represents energy of a frequency point (for example, frequency point j in (b) in FIG. 7) that is Δt apart in time from but has the same frequency as the any one of the frequency points. Therefore, Δ(t, f)−Δ(t−Δt, f) represents an energy difference corresponding to the any one of the frequency points in the first audio signal, and $w_2$ represents a weight of this energy difference. Δ(t, f+1) represents energy of a subsequent frequency point (for example, frequency point i+1 in (b) in FIG. 7) having the same time as the any one of the frequency points. Δ(t−Δt, f+1) represents energy of a frequency point (for example, frequency point j−1 in (b) in FIG. 7) that is Δt apart in time from but has the same frequency as the subsequent frequency point. Therefore, Δ(t, f+1)−Δ(t−Δt, f+1) represents an energy difference corresponding to a subsequent frequency point that is Δt apart in time from but has the same frequency as the any one of the frequency points in the first audio signal, and $w_3$ represents a weight of this energy difference. Here, $w_2$ is greater than both $w_1$ and $w_3$. For example, $w_2$ may be 2, and $w_1$ and $w_3$ are both 1. For example, $w_1+w_2+w_3=1$, where $w_2$ is greater than both $w_1$ and $w_3$, and $w_2$ is not less than ⅓.

It should be understood that, depending on the value of X, this equation is not applicable to the first X frames of audio signal acquired by the electronic device. For example, when X=2, the equation is not applicable to the first frame of audio signal and the second frame of audio signal (the first and second audio signals acquired in the first time period), which are the first frequency point and the last frequency point in the first audio signal and the second audio signal. Therefore, the any one of the frequency points includes no first frequency point or the last frequency point. However, from a macro point of view; this does not affect the processing of audio signals.

It should be understood that the frequency point i+1 corresponding to the time point t−Δt in (a) of FIG. 7 is the same as the frequency point j+1 corresponding to the time point t−Δt in (b) of FIG. 7. The two frequency points are named differently herein for ease of description. Similarly, the frequency point i corresponding to the time point t−Δt in (a) of FIG. 7 is the same as the frequency point j corresponding to the time point t−Δt in (b) of FIG. 7. The frequency point i−1 corresponding to the time point t−Δt in (a) of FIG. 7 is the same as the frequency point j−1 corresponding to the time point t−Δt in (b) of FIG. 7.

It can be understood that the first audio signal may be represented by N (N is an integer power of 2) frequency points. Therefore, N first tags can be computed.

The second tag is used to identify whether a second energy change value of the sound signal corresponding to the any one of the frequency points in the second audio signal conforms to the characteristic of the first noise signal. The second tag of the any one of the frequency points is 0 or 1. The second tag being 0 indicates that the second energy change value of the frequency point does not conform to the characteristic of the first noise signal and that the frequency point is not a first noise signal. The second tag being 1 indicates that the second energy change value of the frequency point conforms to the characteristic of the first noise signal and that the frequency point is probably a first noise signal. In this case, the electronic device may further determine, based on a correlation between the frequency point and a frequency point in the first audio signal having the same frequency as that frequency point, whether the frequency point is a first noise signal.

The second energy change value is used to represent an energy difference between the any one of the frequency points in the second audio signal and another frequency point having the same frequency as but being Δt apart in time from that frequency point. Δt represents a length of the first time period. The second energy change value is used to represent an energy difference between the any one of the frequency points in the current frame of second audio signal and another frequency point in a frame of audio signal previous to the second audio signal having the same frequency as the second audio signal.

The second audio signal may be represented by N (N is an integer power of 2) frequency points. Therefore, N second tags can be computed.

S105: The electronic device computes, based on the first audio signal and the second audio signal, a correlation between the any one of frequency points in the first audio signal and a frequency point in the second audio signal that corresponds to the any one of the frequency points in the first audio signal.

The correlation between the any one of the frequency points in the first audio signal and a frequency point in the second audio signal that corresponds to the any one of the frequency points in the first audio signal is a correlation between a frequency point in the first audio signal and a frequency point in the second audio signal, where the two frequency points have the same frequency. The correlation is used to represent similarity between the two frequency points. The similarity may be used for determining whether a frequency point in the first audio signal and the second audio signal is a first noise signal. For example, when the sound signal corresponding to a frequency point in the first audio signal is a first noise signal, the frequency point in the first audio signal has a low correlation with a corresponding frequency point in the second audio signal. For how this determination is specifically made, reference may be made to the following description of step S106, and details are not described right now.

An equation for computing, by the electronic device, a correlation between the first audio signal and the second audio signal at any corresponding frequency point is:

$$\gamma_{12}(t, f) = \frac{\phi_{12}(t, f)}{\sqrt{\phi_{11}(t, f)\phi_{22}(t, f)}}$$

In the equation, $\gamma_{12}(t, f)$ represents the correlation between the first audio signal and the second audio signal at any corresponding frequency point, $\phi_{12}(t, f)$ represents a cross-power spectrum between the first audio signal and the second audio signal at the frequency point, $\phi_{11}(t, f)$ represents a self-power spectrum of the first audio signal at the frequency point, and $\phi_{22}(t, f)$ represents a self-power spectrum of the second audio signal at the frequency point.

$\phi_{12}(t, f)$, $\phi_{11}(t, f)$, and $\phi_{22}(t, f)$ are found according to the following equations:

$$\phi_{12}(t, f) = E\{X_1\{t, f\}X_2^*\{t, f\}\}$$

-continued $$\phi_{11}(t, f) = E\{X_1\{t, f\}X_1^*\{t, f\}\}$$

$$\phi_{22}(t, f) = E\{X_2\{t, f\}X_2^*\{t, f\}\}$$

In the three equations, E{ } is an operator: $X_1\{t, f\}=A(t, f)*\cos(w)+j*A(t, f)*\sin(w)$, which represents a complex number domain of the frequency point in the first audio signal, where the complex number domain represents amplitude and phase information of the sound signal corresponding to the frequency point, and A (t, f) represents energy of the sound signal corresponding to this frequency point in the first audio signal; and $X_2\{t, f\}=A'(t, f)*\cos(w)+j*A'(t, f)*\sin(w)$, which represents a complex number domain of the frequency point in the second audio signal, where the complex number domain represents amplitude and phase information of the sound signal corresponding to the frequency point, and A'(t, f) represents energy of the sound signal corresponding to this frequency point in the second audio signal.

It can be understood that the first audio signal may be represented by N (N is an integer power of 2) frequency points. Therefore, N correlations can be computed.

S106: The electronic device determines whether the first audio signal and the second audio signal include any first noise signal.

Detailed description is given below with an example used that the electronic device determines whether the first audio signal includes any first noise signal. For a process of determining, by the electronic device, whether the second audio signal includes any first noise signal, reference may be made to the process here.

Based on the first tag of the any one of the frequency points in the first audio signal as computed in step S104 and the correlation between the any one of frequency points in the first audio signal and a frequency point in the second audio signal that corresponds to the any one of the frequency points in the first audio signal as computed in step S105, the electronic device can determine whether the first audio signal includes any first noise signal.

Specifically, when the first tag of the any one of the frequency points in the first audio signal is 1 and the correlation between the any one of the frequency points and the frequency point in the second audio signal that corresponds to the any one of the frequency points in the first audio signal is less than a second threshold, the electronic device may determine that the sound signal corresponding to the frequency point is a first noise signal. On the contrary, the sound signal corresponding to the frequency point is not a first noise signal.

When a first tag of one frequency point in the sound signals corresponding to the 1024 frequency points in the first audio signal is 1, and a correlation between the one frequency point and a corresponding frequency point in the second audio signal is less than the second threshold, the electronic device determines that the first audio signal includes a first noise signal. Otherwise, the electronic device determines that the first audio signal includes no first noise signal. The electronic device then determines whether the second audio signal includes any first noise signal.

For the process of determining, by the electronic device, whether the second audio signal includes any first noise signal, reference may be made to the foregoing related descriptions of determining, by the electronic device, whether the first audio signal includes any first noise signal, and details are not repeated herein.

The second threshold is chosen based on experience, and the embodiments of this application impose no limitation thereon.

In some embodiments, for the 1024 frequency points corresponding to the first audio signal, the electronic device may determine whether any sound signal corresponding to one of the 1024 frequency points is a first noise signal, where the determination is made for the 1024 frequency points in turn from low frequency to high frequency.

Based on the foregoing descriptions, it can be learned that firm holding of the electronic device will not cause the first audio signal and the second audio signal to both include a first noise signal. When determining that one of the first audio signal and the second audio signal includes a first noise signal, the electronic device can determine that the first audio signal and the second audio signal include a first noise signal, and the electronic device may execute step S107 to step S111.

When determining that neither of the first audio signal and the second audio signal includes a first noise signal, the electronic device can determine that the first audio signal and the second audio signal include no first noise signal, and the electronic device may execute step S112.

S107: The electronic device determines that the first audio signal includes a first noise signal.

After determining that the first audio signal includes a first noise signal, the electronic device may remove the first noise signal. If the first audio signal comes from right ahead of the electronic device, the electronic device may replace the first noise signal in the first audio signal with a sound signal in the second audio signal that corresponds to the first noise signal. If the first audio signal does not come from right ahead of the electronic device, the electronic device may filter the first audio signal to remove the first noise signal. Thus, a first audio signal with the first noise signal removed is obtained. For detailed steps, reference may be made to the following descriptions of step S108 to step S111.

It should be understood that, for a process of determining, by the electronic device, that the second audio signal includes a first noise signal, reference may be made to the description of step S107, except that in that process, functions of the first audio signal and the second audio signal are interchanged. Details are not repeated herein.

S108: The electronic device determines a sound source orientation of a sound producing object based on the first audio signal and the second audio signal.

The sound source orientation may be described by a horizontal angle between the sound producing object and the electronic device. It may be described in other ways as well, for example, described by both the horizontal angle and a pitch angle between the sound producing object and the electronic device. This is not limited in the embodiments of this application.

It is assumed that the horizontal angle between the sound producing object and the electronic device is denoted as θ.

In some embodiments, the electronic device may determine this θ based on the first audio signal and the second audio signal by using a high-resolution spatial spectrum estimation algorithm.

In some other embodiments, the electronic device may determine this θ based on beamforming (beamforming) of the N microphones, the first audio signal, and the second audio signal by using a maximum-output-power beamforming algorithm.

It can be understood that the electronic device may determine the horizontal angle θ in other ways as well. The embodiments of this application impose no limitation thereon.

Using the maximum-output-power beamforming algorithm to determine the horizontal angle θ is used as an example. A possible implementation algorithm is introduced below in detail with reference to the specific algorithm. It can be understood that this algorithm does not limit this application.

By comparing output powers of the first audio signal and the second audio signal in various directions, the electronic device may determine a beam direction of a maximum power as a target sound source orientation, where the target sound source orientation is a sound source orientation of a user. The equation for obtaining the target sound source orientation θ may be expressed as:

$$\theta = \max_{\theta} \sum_{f} \left\| \sum_{i} H_i(f, \theta) Y_i(t, f) \right\|^2$$

In the equation, f represents a value of a frequency point in frequency domain: i represents the i-th microphone: $H_i(f, \theta)$ represents a beam weight of the i-th microphone in beamforming; and $Y_i(t, f)$ represents an audio signal in time-frequency domain obtained from sound information acquired by the i-th microphone. Therefore, when i=1, $Y_i(t, f)=Y_1(t, f)$ represents the first audio signal and $Y_i(t, f)=Y_2(t, f)$ represents the second audio signal.

Beamforming refers to responses of the N microphones to a sound signal. Because the response varies in different orientations, beamforming is correlated with the sound source orientation. Therefore, beamforming can locate a sound source in real time and suppress interference of background noise.

Beamforming may be expressed as a 1×N matrix denoted by H(f, θ), where N is the number of microphones. A value of the i-th element of the beamforming may be expressed as $H_i(f, \theta)$. This value is associated with an arrangement position of the i-th microphone in the N microphones. The beamforming may be obtained by using a power spectrum, where the power spectrum may be a capon spectrum, a barttlett spectrum, or the like.

For example, a barttlett spectrum is used as an example. The electronic device uses the barttlett spectrum to obtain the i-th element of the beamforming, where the i-th element may be expressed as $H_i(f, \theta)=\exp\{j\varphi_f(\tau_i)\}$. In the equation, j is an imaginary number, $\varphi_f$ is a phase compensation value of a beamformer for the microphone, and $\tau_i$ represents a delay deviation of same sound information reaching the i-th microphone. The delay deviation is associated with the sound source orientation and a location of the i-th microphone, and reference may be made to the descriptions below.

The center of the first microphone able to receive sound information in the N microphones is selected as an origin, by which a three-dimensional space coordinate system is established. In this three-dimensional space coordinate system, a distance of the N-th microphone relative to the microphone that is used as the origin may be expressed as $P_i=d_i$. Then, a relationship between $\tau_i$ and the sound source orientation and location of the i-th microphone may be expressed by the following equation:

$$\tau_i = \frac{d_i \cos\theta}{c}$$

where c is the propagation speed of a sound signal.

S109: The electronic device determines whether the sound producing object is directly facing the electronic device.

Directly facing the electronic device means that the sound producing object is right ahead of the electronic device. The electronic device determines, by determining whether the horizontal angle between the sound producing object and the electronic device is close to 90°, whether the sound producing object is directly facing the electronic device.

Specifically, when |θ-90° | is less than a third threshold, the electronic device determines that the sound producing object is directly facing the electronic device. When |θ-90°) is greater than the third threshold, the electronic device determines that the sound producing object is not directly facing the electronic device. A value of the third threshold is predetermined based on experience. In some embodiments, the third threshold may be in a range of 5°-10°, for example, 10°.

If the electronic device determines that the sound producing object is directly facing the electronic device, step S110 may be executed.

If the electronic device determines that the sound producing object is not directly facing the electronic device, step S111 may be executed.

S110: The electronic device replaces the first noise signal in the first audio signal with a sound signal in the second audio signal that corresponds to the first noise signal, so as to obtain a first audio signal with the first noise signal replaced.

The sound signal in the second audio signal that corresponds to the first noise signal refers to sound signals corresponding to all frequency points in the second audio signal that have the same frequency as the first noise signal.

The electronic device can detect a first noise signal in the first audio signal, determine all frequency points corresponding to the first noise signal, and then replace all the frequency points in the first audio signal that correspond to the first noise signal with frequency points in the second audio signal that have the same frequency as those frequency points.

Specifically, according to continuity of first noise signals in frequency, there is a first frequency point in the first audio signal such that, in the first audio signal, a sound signal corresponding to a frequency point having a higher frequency than the first frequency point is not a first noise signal, and a sound signal corresponding to any frequency point having a lower frequency than the first frequency point is a first noise signal. As such, the electronic device may determine whether the sound signals corresponding to all the frequency points in the first audio signal are first noise signals, where the determination may be made for the frequency points in turn from low frequency to high frequency. The determining method here is the same as that described in step S106, and details are not repeated herein. When the electronic device determines a frequency point which is the first that corresponds to a sound signal that is not a first noise signal, the electronic device may determine that frequency point as the first frequency point, and that sound signals corresponding to all frequency points having a lower frequency than the first frequency point are first noise signals.

The electronic device may replace the first noise signal in the first audio signal with a sound signal in the second audio signal that corresponds to the first noise signal. Specifically, the electronic device may replace all frequency points in the first audio signal that have a lower frequency than the first frequency point with all frequency points in the second audio signal that have a lower frequency than the first frequency point, so as to obtain a first audio signal with the first noise signal replaced.

S111: The electronic device filters the first audio signal to remove the first noise signal therein, so as to obtain a first audio signal with the first noise signal removed.

Now that the electronic device has detected the first noise signal in the first audio signal, the electronic device may filter the first audio signal to remove the first noise signal therein, so as to obtain a first audio signal with the first noise signal removed. The filtering method here is the same as that in the prior art, and common filtering methods may be adaptive blocking filtering, wiener filtering, and the like.

S112: The electronic device outputs the first audio signal and the second audio signal.

In some embodiments, the electronic device does not perform any processing on the first audio signal and the second audio signal, but directly outputs the first audio signal and the second audio signal and transmits them to another module that processes audio signals, for example, a denoising module.

Optionally, in some embodiments, the electronic device may alternatively perform inverse fourier transform (inverse fourier transform, IFT) on the first audio signal and the second audio signal before transmitting them to another module that processes audio signals, for example, a denoising module. It should be understood that in the embodiments of this application, an example is used that the electronic device acquires two audio signals (the first input audio signal and the second input audio signal), and when the electronic device has more than two microphones, the method in the embodiments of this application can also be used.

It should be understood that the embodiments of this application are applicable not only in the case of two input audio signals but also in the case of more than two input audio signals.

Specifically, the foregoing step S101 to step S112 are described by using an example that the electronic device uses two microphones to acquire the first input audio signal and the second input audio signal and uses the method in the embodiments of this application to remove the first noise signal in the first input audio signal and the second output audio signal. In other cases, the electronic device may use more microphones to acquire other input audio signals and then remove the first noise signal in the other input audio signals based on another input audio signal such as the first input audio signal. For example, when the electronic device has three microphones, the electronic device may use the third microphone to acquire a third input audio signal, and then remove the first noise signal in the third input audio signal based on the first input audio signal or the second input audio signal (it can be understood that in the case of removal based on the first input audio signal, the third input audio signal may be treated as the second input audio signal; and in the case of removal based on the second input audio signal, the second input audio signal may be treated as the first input audio signal). For this process, reference may be made to the foregoing descriptions of step S101 to step S112, and details are not repeated herein.

The following describes use scenarios of the audio processing method in this application.

Scenario 1: When a camera application on an electronic device is opened and starts to record video, a microphone of the electronic device can acquire an audio signal. In this case, the electronic device may perform processing on the acquired audio signal in real time by using the audio processing method in the embodiments of this application.

Figure 8A:
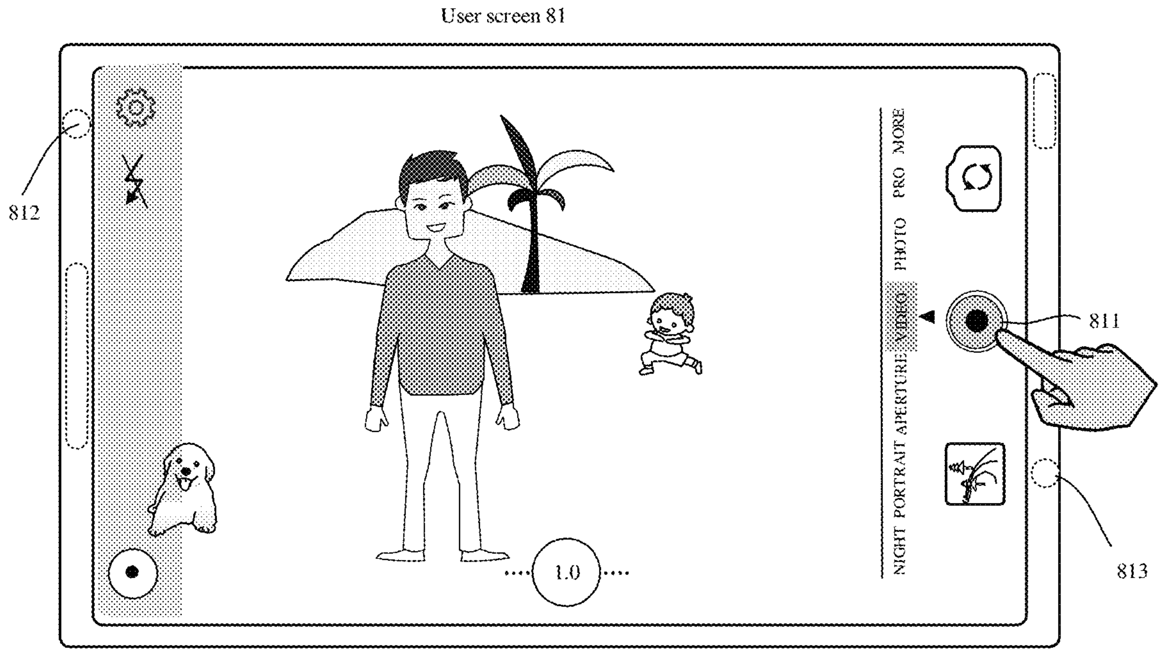
Figure 8B:
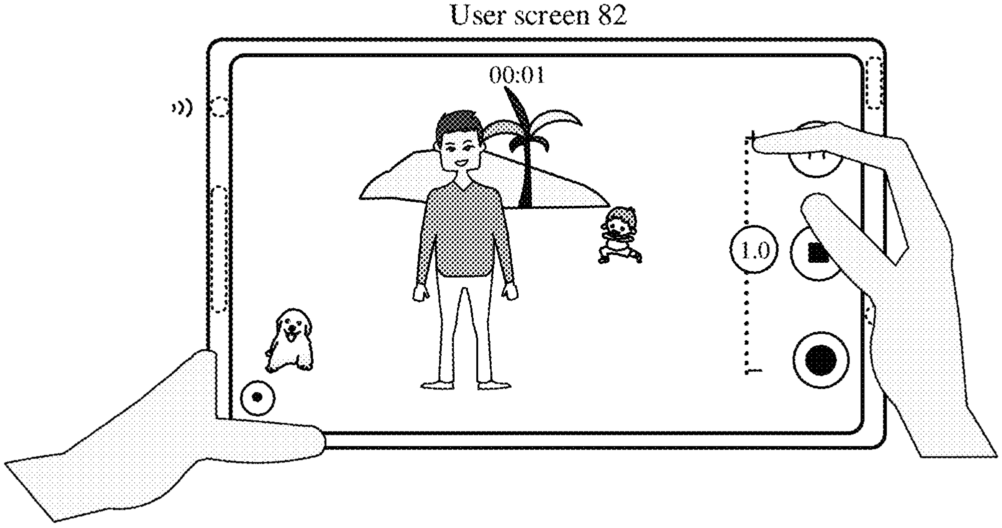

FIG. 8*a* and FIG. 8*b* are a set of illustrative user screens of an electronic device processing an audio signal in real time by using the audio processing method of this application.

As shown in a user screen 81 of FIG. 8*a*, the user screen 81 may be a preview screen of the electronic device before video recording. The user screen 81 may include a recording control 811. The recording control may be configured for the electronic device to start recording video. The electronic device includes a first microphone 812 and a second microphone 813. In response to a first operation (for example, a tap operation) on the recording control 811, the electronic device may start recording video and acquire an audio signal simultaneously. The user screen shown in FIG. 8*b* is displayed.

As shown in FIG. 8*b*, the user screen 82 is a user screen when the electronic device is acquiring and recording video. During video recording, the electronic device may use the first microphone and the second microphone to acquire audio signals. At this time point, a hand of the user rubs against the first microphone 813, causing the acquired audio signal to include a first noise signal. In this case, the electronic device may use the audio processing method in the embodiments of this application to detect and suppress the first noise signal in the audio signal acquired at this time point, so that a played audio signal may not include the first noise signal, thus reducing impact of the first noise signal on audio quality.

In the foregoing scenario 1, the recording control 811 may be referred to as a first control, and the user screen 82 may be referred to as a recording screen.

Scenario 2: An electronic device may also use the audio processing method in this application to perform post-processing on audio in a recorded video.

Figure 9A:
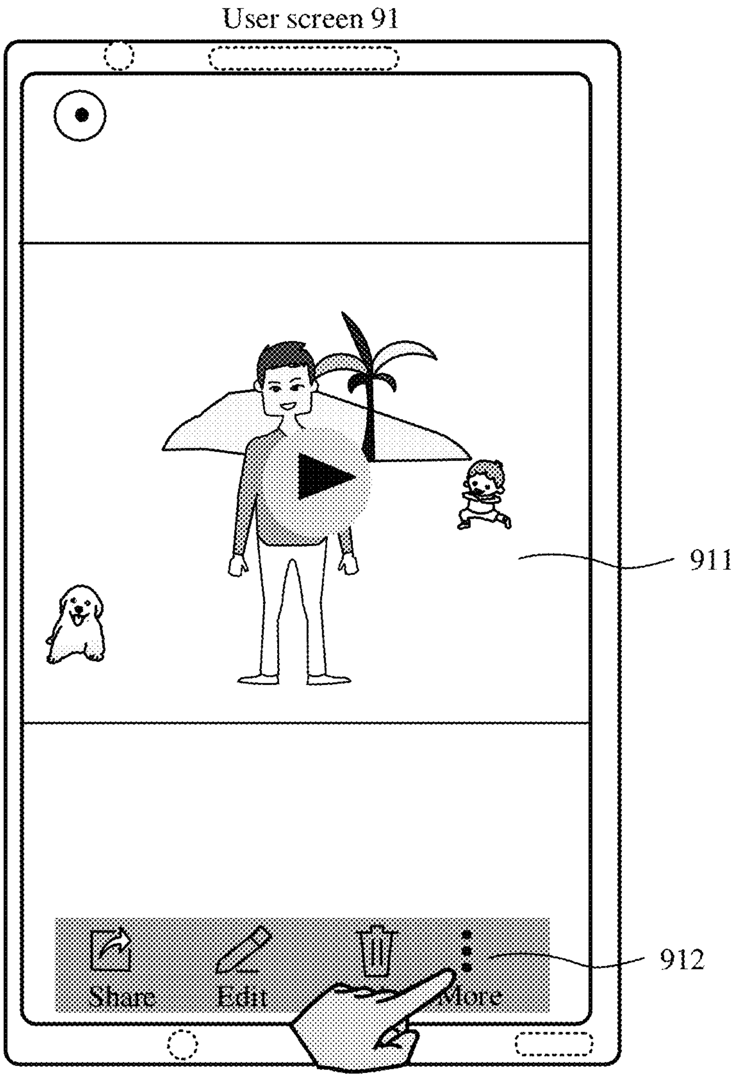
Figure 9B:
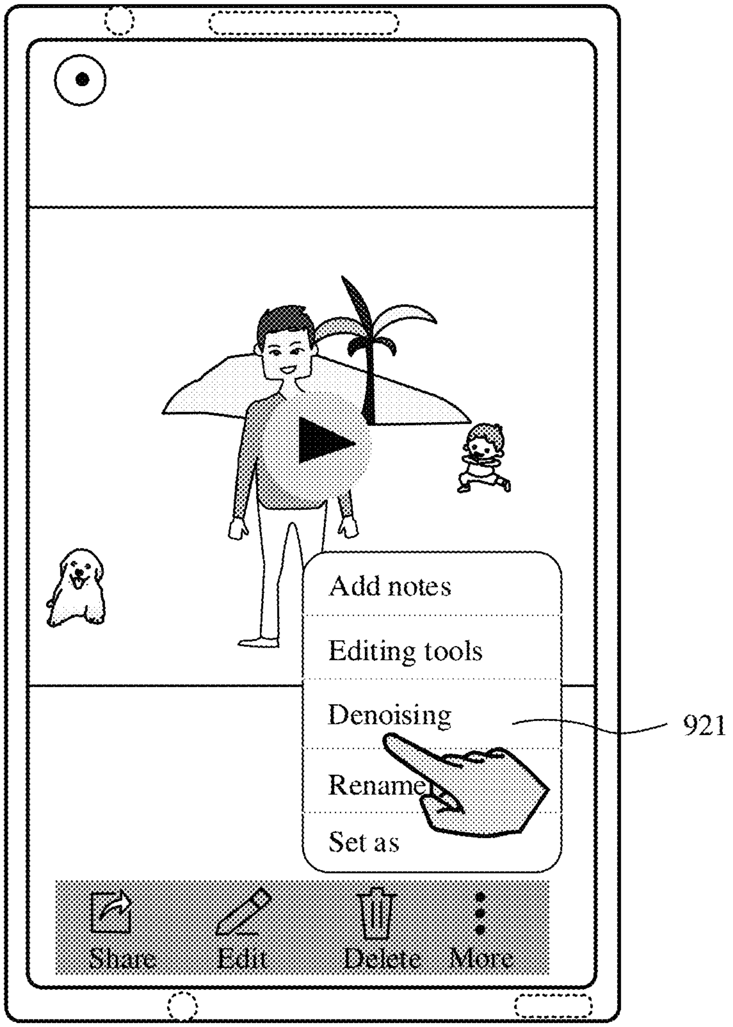
Figure 9C:
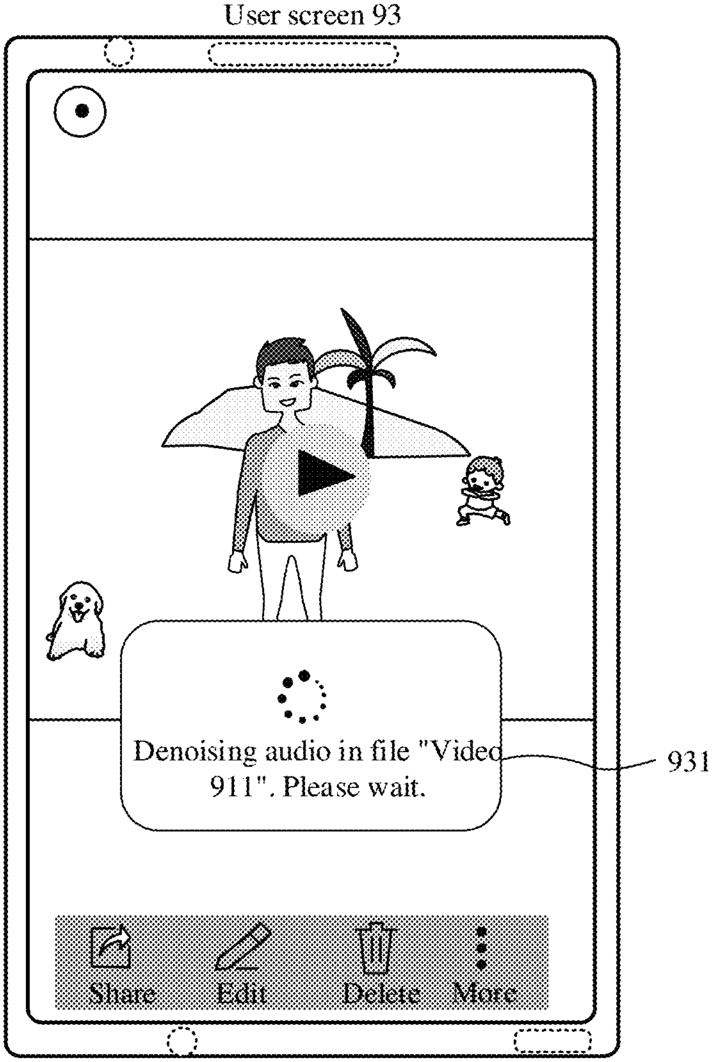

FIG. 9*a* to FIG. 9*c* are a set of illustrative user screens of post-processing an audio signal by using the audio processing method of this application.

As shown in FIG. 9*a*, a user screen 91 is a video setting screen of the electronic device. The user screen 91 may include a video 911 recorded by the electronic device, and the user screen 91 may also include more setting options 912. The more setting options 912 are configured to display other setting options for the video 911. In response to an operation (for example, a tap operation) on the more setting options 912, the electronic device may display a user screen as shown in FIG. 9*b*.

As shown in FIG. 9*b*, the user screen 92 may include a denoising mode setting option 921, and the denoising mode setting option is configured to trigger the electronic device to implement the audio processing method in this application to remove a first noise signal in audio in the video 911. In response to an operation (for example, a tap operation) on the denoising mode setting option 921, the electronic device may display a user screen as shown in FIG. 9*c*.

As shown in FIG. 9*c*, the user screen 93 is a user screen for the electronic device to implement the audio processing method in this application to remove the first noise signal in the audio in the video 911. The user screen 93 includes a prompt box 931, where the prompt box 931 further includes prompt text "Denoising audio in file "Video 911". Please wait." At this time point, the electronic device is performing post-processing on the audio in the recorded video by using the audio processing method in this application.

It can be understood that, in addition to the foregoing use scenarios, the audio processing method in the embodiments of this application may also be applied in other scenarios. For example, the audio processing method in the embodiments of this application may also be used during recording. The foregoing use scenarios shall not constitute any limitation on the embodiments of this application.

To sum up, the electronic device can use the audio processing method in the embodiment of this application to detect and suppress first noise signals in the first audio signal, as to reduce impact of the first noise signal on audio quality. If a sound source is right ahead of the electronic device, the electronic device may replace the first noise signal in the first audio signal with a sound signal in the second audio signal that corresponds to the first noise signal. If the sound source is right ahead of the electronic device, the electronic device filters the first audio signal to remove the first noise signal. In this way, an effect of generating stereophonic sound by the electronic device using audio signals acquired by different microphones is not affected while the first noise signal in the first audio signal is removed. The electronic device may also use the same method to detect and suppress first noise signals in the second audio signal, as to reduce impact of the first noise signal on audio quality.

It should be understood that in the embodiments of this application, an example is used that the electronic device acquires two audio signals (the first input audio signal and the second input audio signal), and when the electronic device has more than two microphones, the method in the embodiments of this application can also be used.

The following describes an illustrative electronic device 100 provided in the embodiments of this application.

FIG. 10 is a schematic structural diagram of an electronic device 100 according to an embodiment of this application.

The following describes this embodiment in detail by using the electronic device 100 as an example. It should be understood that the electronic device 100 may have more or fewer components than shown in the figure, or combine two or more components, or have different component configurations. Various components shown in the figure may be implemented by using hardware, software, or a combination of hardware and software including one or more signal processors and/or application-specific integrated circuits.

The electronic device 100 may include a processor 110, an external memory interface 120, an internal memory 121, a universal serial bus (universal serial bus, USB) interface 130, a charge management module 140, a power management module 141, a battery 142, an antenna 1, an antenna 2, a mobile communications module 150, a wireless communications module 160, an audio module 170, a loudspeaker 170A, a telephone receiver 170B, a microphone 170C, an earphone jack 170D, a sensor module 180, a button 190, a motor 191, an indicator 192, a camera 193, a display 194, a subscriber identity module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure illustrated in this embodiment of this application does not constitute any specific limitation on the electronic device 100. In some other embodiments of this application, the electronic device 100 may include more or fewer components than shown in the figure, or combine some components, or split some components, or have a different component arrangement. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be separate devices or may be integrated into one or more processors.

The controller may be a nerve center and command center of the electronic device 100. The controller may generate an operation control signal according to instruction operation code and a timing signal so as to complete control of instruction fetching and execution.

The processor 110 may be further provided with a memory for storing instructions and data. In some embodiments, the memory in the processor 110 is a cache memory. The memory may store instructions or data recently used or repeatedly used by the processor 110. If the processor 110 needs to use the instructions or data again, the processor 110 may directly invoke the instructions or data from the memory. This avoids repeated access and reduces waiting time of the processor 110, thereby improving system efficiency.

In some embodiments, the processor 110 may include one or more interfaces. The interfaces may include an inter-integrated circuit (inter-integrated circuit, I2C) interface, an inter-integrated circuit sound (inter-integrated circuit sound, I2S) interface, a pulse code modulation (pulse code modulation, PCM) interface, and the like.

The charge management module 140 is configured to receive charge input from a charger. The charger may be a wireless charger or a wired charger.

The power management module 141 is configured to connect the battery 142, the charge management module 140, and the processor 110. The power management module 141 receives input from the battery 142 and/or the charge management module 140 to supply power to the processor 110, the internal memory 121, an external memory; the display 194, the camera 193, the wireless communications module 160, and the like.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna of the electronic device 100 may be configured to cover one or more communication bands. Different antennas may further support multiplexing so as to increase antenna utilization.

The mobile communications module 150 may provide wireless communication solutions including 2G, 3G, 4G, 5G and the like which are applied to the electronic device 100.

The modem processor may include a modulator and a demodulator. The modulator is configured to modulate a low frequency baseband signal that is to be sent into a medium or high frequency signal. The demodulator is configured to demodulate a received electromagnetic wave signal into a low frequency baseband signal.

The wireless communications module 160) may provide wireless communication solutions applied to the electronic device 100, including wireless local area network (wireless local area networks, WLAN) (for example, wireless fidelity (wireless fidelity, Wi-Fi) network), bluetooth (bluetooth, BT), global navigation satellite system (global navigation satellite system, GNSS), and the like. The wireless communications module 160 may be one or more devices integrating at least one communication processing module.

In some embodiments, in the electronic device 100, the antenna 1 is coupled to the mobile communications module 150, and the antenna 2 is coupled to the wireless communications module 160, so that the electronic device 100 can communicate with a network and other devices by using a wireless communications technology.

The electronic device 100 implements a display function by using the GPU, the display 194, the application processor, and the like. The GPU is an image processing microprocessor connected to the display 194 and the application processor. The GPU is configured to perform mathematical and geometric computation for graphics rendering. The processor 110 may include one or more GPUs that execute program instructions to generate or change display information.

The display 194 is configured to display images, videos, and the like. The display 194 includes a display panel. The display panel may be a liquid crystal display (liquid crystal display; LCD), an organic light-emitting diode (organic light-emitting diode, OLED) display, or the like. In some embodiments, the electronic device 100 may include one or N displays 194, where N is a positive integer greater than 1.

The electronic device 100 may implement a shooting function by using the ISP, the camera 193, the video codec, the GPU, the display 194, the application processor, and the like.

The ISP is configured to process data returned by the camera 193. For example, during photographing, a shutter is open, allowing light to be transmitted to a photosensitive element of the camera through a lens. An optical signal is converted into an electrical signal. The photosensitive element of the camera transfers the electrical signal to the ISP for processing, so as to convert the electrical signal into an image visible to the naked eye. The ISP may further optimize noise, brightness, and skin color of the image using algorithms. The ISP may further optimize parameters such as exposure and color temperature of a shooting scene. In some embodiments, the ISP may be disposed in the camera 193.

The camera 193 is configured to capture a static image or a video. An optical image of an object is generated by the lens and projected onto the photosensitive element. The photosensitive element may be a charge coupled device (charge coupled device, CCD), or a complementary metal-oxide semiconductor (complementary metal-oxide semiconductor, CMOS) phototransistor. The photosensitive element converts an optical signal to an electrical signal, and then transmits the electrical signal to the ISP which converts the electrical signal to a digital image signal. The ISP outputs the digital image signal to the DSP for processing. The DSP converts the digital image signal to an image signal in a standard format of RGB, YUV, or the like. In some embodiments, the electronic device 100 may include one or N cameras 193, where N is a positive integer greater than 1.

The digital signal processor is configured to process digital signals, including not only digital image signals but also other digital signals. For example, when the electronic device 100 is selecting a frequency point, the digital signal processor is configured to perform fourier transform and the like on energy of that frequency point.

The video codec is configured to compress or decompress a digital video. The electronic device 100 may support one or more types of video codecs. Thus, the electronic device 100 can play or record videos in a plurality of coding formats, such as moving picture experts group (moving picture experts group, MPEG) 1, MPEG2, MPEG3, and MPEG4.

The NPU is a neural-network (neural-network, NN) computing processor which borrows the structure of biological neural networks, for example, borrowing the transfer mode between human brain neurons, to fast process input information and which is also capable of continuous self-learning. Applications such as intelligent cognition of the electronic device 100, for example, image recognition, face recognition, speech recognition, and text understanding, can be implemented by using the NPU.

The external memory interface 120 may be configured to connect an external storage card, for example, a micro SD card, to extend a storage capacity of the electronic device 100. The external memory card communicates with the processor 110 through the external memory interface 120 to implement a data storage function. For example, files such as music and video files are stored in the external storage card.

The internal memory 121 may be configured to store computer executable program code, where the executable program code includes instructions. By running the instructions stored in the internal memory 121, the processor 110 executes various functional applications and data processing of the electronic device 100. The internal memory 121 may include a storage program area and a storage data area. The storage program area may store an operating system, an application required by at least one function (for example, a face recognition function, a fingerprint recognition function, and a mobile payment function), and the like. The data storage area may store data (for example, face information template data and fingerprint information template) created during use of the electronic device 100, and the like. In addition, the internal memory 121 may include a high-speed random access memory and may further include a non-volatile memory, for example, at least one magnetic disk storage device, flash memory device, or universal flash storage (universal flash storage, UFS).

The electronic device 100 may use the audio module 170, the speaker 170A, the telephone receiver 170B, the microphone 170C, the earphone jack 170D, the application processor, and the like to implement an audio function, for example, music playing and sound recording.

The audio module 170 is configured to convert digital audio information into an analog audio signal for output, and is also configured to convert analog audio input into a digital audio signal. The audio module 170 may be further configured to encode and decode audio signals. In some embodiments, the audio module 170 may be provided in the processor 110, or some functional modules of the audio module 170 may be provided in the processor 110. The audio module 170 may convert an audio signal from time domain to frequency domain or from frequency domain to time domain. For example, the processes in the foregoing step S102 may be completed by the audio module 170.

The speaker 170A, also referred to as a "loudspeaker", is configured to convert audio electrical signals into sound signals. The electronic device 100 may use the speaker 170A to play music or a hands-free call.

The telephone receiver 170B, also referred to as an "earpiece", is configured to convert audio electrical signals into sound signals. When the electronic device 100 receives a call or a voice message, the telephone receiver 170B may be placed close to a human ear for listening to voice.

The microphone 170C, also referred to as a "mic" or "mike", is configured to convert sound signals into electrical signals. When making a call or sending a voice message, the user may put the human mouth close to the microphone 170C so as input a sound signal to the microphone 170C. The electronic device 100 may be provided with at least one microphone 170C. In some other embodiments, the electronic device 100 may be provided with two microphones 170C, which can implement a noise reduction function in addition to sound signal acquisition. In some other embodiments, the electronic device 100 may alternatively be provided with three, four, or more microphones 170C to acquire sound signals, reduce noise, identify a sound source, and implement a directional recording function, among others. The microphone 170C may complete acquisition of the first input audio signal and the second input audio signal in step S101.

The earphone jack 170D is configured to connect a wired earphone. The earphone jack 170D may be a USB interface 130, a 3.5 mm open mobile terminal platform (open mobile terminal platform, OMTP) standard interface, or a cellular telecommunications industry association of the USA (cellular telecommunications industry association of the USA, CTIA) standard interface.

The pressure sensor 180A is configured to sense a pressure signal, and is capable of converting the pressure signal to an electrical signal. In some embodiments, the pressure sensor 180A may be provided at the display 194. There are many types of pressure sensors 180A, such as resistive pressure sensors, inductive pressure sensors, and capacitive pressure sensors.

The gyro sensor 180B may be configured for determining a motion posture of the electronic device 100. In some embodiments, angular velocities of the electronic device 100 about three axes (that is, x, y, and z axes) may be determined by using the gyro sensor 180B. The gyro sensor 180B may be configured for image stabilization.

The barometric pressure sensor 180C is configured to measure barometric pressure. In some embodiments, the electronic device 100 computes an altitude based on a barometric pressure value measured by the barometric pressure sensor 180C to assist in positioning and navigation.

The magnetic sensor 180D includes a Hall sensor. The electronic device 100 may detect opening and closing of a clamshell or a smart cover by using the magnetic sensor 180D. In some embodiments, when the electronic device 100 is a clamshell device, the electronic device 100 may detect opening and closing of a clamshell by using the magnetic sensor 180D. Then, a feature such as automatic unlocking upon opening of the clamshell is set based on a detected opening or closing state of the smart cover or a detected opening or closing state of the clamshell.

The acceleration sensor 180E may detect magnitudes of acceleration of the electronic device 100 in various directions (generally three axes). When the electronic device 100 is stationary, the acceleration sensor 180E may detect a magnitude and direction of gravity. The electronic device 100 may also be configured for posture recognition of the electronic device, applied for applications such as landscape and portrait screen switching and pedometer.

The distance sensor 180F is configured to measure distance. The electronic device 100 may measure a distance through infrared or laser. In some embodiments, when shooting a scene, the electronic device 100 may use the distance sensor 180F for distance measurement so as to achieve fast focusing.

The proximity light sensor 180G may include, for example, a light emitting diode (LED) and a light detector, for example, a photodiode. The light emitting diode may be an infrared light emitting diode. The electronic device 100 emits infrared light outwards using the light emitting diode. The electronic device 100 detects reflected infrared light from a nearby object by using the photodiode. When sufficient reflected light is detected, the electronic device 100 may determine that there is an object near the electronic device 100.

The ambient light sensor 180L is configured to sense ambient light brightness. The electronic device 100 may adaptively adjust brightness of the display 194 based on the sensed ambient light brightness. The ambient light sensor 180L may also be configured to automatically adjust the white balance in photographing. The ambient light sensor 180L may also cooperate with the proximity light sensor 180G to detect whether the electronic device 100 is in a pocket, so as to prevent touch by mistake.

The fingerprint sensor 180H is configured to acquire fingerprints. Based on characteristics of an acquired fingerprint, the electronic device 100 can implement functions such as unlock with a fingerprint, access to an application lock, taking a photo with a fingerprint, answering an incoming call with a fingerprint.

The temperature sensor 180J is configured to detect temperature. In some embodiments, the electronic device 100 executes a temperature processing policy by using the temperature detected by the temperature sensor 180J. For example, when a temperature reported by the temperature sensor 180J exceeds a threshold, the electronic device 100 reduces performance of a processor located near the temperature sensor 180J so as to reduce power consumption and implement thermal protection.

The touch sensor 180K may also be called a "touch panel". The touch sensor 180K may be disposed at the display 194, and the touch sensor 180K and the display 194 form a touchscreen, also referred to as a "touch screen". The touch sensor 180K is configured to detect a touch operation performed on or near the touch sensor 180K.

The button 190 includes a power on/off button, a volume button, and the like. The button 190 may be a mechanical button, or may be a touch button. The electronic device 100 may receive button input and generate button signal input related to user setting and function control of the electronic device 100.

The motor 191 can generate vibration alerts. The motor 191 may be configured to provide a vibration alert for an incoming call, and may also be configured to provide a vibration feedback for a touch. For example, touch operations acting on different applications (for example, camera and audio player) may correspond to different vibration feedback effects.

The indicator 192 may be an indicator lamp and may be configured to indicate a charging status and power change, and may also be configured to indicate a message, a missed call, a notification, and the like.

The SIM card interface 195 is configured to connect a SIM card. The SIM card may be inserted into the SIM card interface 195 or pulled out of the SIM card interface 195 to achieve contact with or separation from the electronic device 100.

In the embodiments of this application, the internal memory 121 may store computer instructions related to the audio processing method in this application, and the processor 110 may call the computer instructions stored in the internal memory 121 to cause the electronic device to perform the audio processing method in the embodiments of this application.

In the embodiments of this application, the internal memory 121 of the electronic device or a storage device externally connected to the storage interface 120 may store relevant instructions related to the audio processing method in the embodiments of this application, so that the electronic device executes the audio processing method in the embodiments of this application.

The following illustratively describes the workflow of the electronic device with reference to step S101 to step S112 and a hardware structure of the electronic device.

1: The electronic device acquires a first input audio signal and a second input audio signal.

In some embodiments, the touch sensor 180K of the electronic device receives a touch operation (triggered when a user touches a shooting control), and a corresponding hardware interrupt is sent to a kernel layer. The kernel layer processes the touch operation to a raw input event (including information such as touch coordinates and a timestamp of the touch operation). The raw input event is stored on the kernel layer. An application framework layer obtains the raw input event from the kernel layer, and identifies a control corresponding to the input event.

For example, the touch operation is a single-tap touch operation, and the control corresponding to the single-tap operation is a shooting control in a camera application. The camera application calls an interface of the application framework layer to start the camera application, and then calls the kernel layer to start a microphone driver, so as to acquire the first input audio signal through the first microphone and acquire the second input audio signal through the second microphone.

Specifically, the microphone 170C of the electronic device may convert an acquired sound signal to an analog electrical signal. This electrical signal is then converted to an audio signal in time domain. The audio signal in time domain is a digital audio signal, which is stored in a form of 0s and 1s, and the processor of the electronic device can perform processing on the audio signal in time domain. The audio signal refers to the first input audio signal and also the second input audio signal.

Then the electronic device may store the first input audio signal and the second input audio signal in the internal memory 121 or in the storage device externally connected to the storage interface 120.

2: The electronic device converts the first input audio signal and the second input audio signal to frequency domain to obtain a first audio signal and a second audio signal.

The digital signal processor of the electronic device obtains the first input audio signal and the second input audio signal from the internal memory 121 or the storage device externally connected to the storage interface 120, and converts the first input audio signal and the second input audio signal to frequency domain so as to obtain the first audio signal and the second audio signal.

Then the electronic device may store the first audio signal and the second audio signal in the internal memory 121 or in the storage device externally connected to the storage interface 120.

3. The electronic device computes a first tag of a sound signal corresponding to any one of frequency points in the first audio signal.

The electronic device may obtain, by using the processor 110, the first audio signal stored in the memory 121 or in the storage device externally connected to the storage interface 120. The processor 110 of the electronic device invokes a relevant computer instruction to compute the first tag of the sound signal corresponding to the any one of the frequency points in the first audio signal, and then stores the first tag of the sound signal corresponding to the any one of the frequency points in the first audio signal in the memory 121 or the storage device externally connected to the storage interface 120.

4. The electronic device computes a correlation between the any one of the frequency points in the first audio signal and a frequency point in the second audio signal that corresponds to the any one of the frequency points in the first audio signal.

The electronic device may obtain, by using the processor 110, the first audio signal and the second audio signal stored in the memory 121 or in the storage device externally connected to the storage interface 120. The processor 110 of the electronic device invokes a relevant computer instruction to compute, based on the first audio signal and the second audio signal, the correlation between the any one of frequency points in the first audio signal and the frequency point in the second audio signal that corresponds to the any one of the frequency points in the first audio signal, and then stores the correlation between the any one of frequency points in the first audio signal and the frequency point in the second audio signal that corresponds to the any one of the frequency points in the first audio signal in the memory 121 or the storage device externally connected to the storage interface 120.

5: The electronic device determines whether the first audio signal includes any first noise signal.

The electronic device may obtain, by using the processor 110, the first audio signal stored in the memory 121 or in the storage device externally connected to the storage interface 120. The processor 110 of the electronic device invokes a relevant computer instruction to determine, based on the first audio signal and the second audio signal, whether the first audio signal includes any first noise signal.

After determining that the first audio signal includes a first noise signal, the electronic device performs the following step 6 to step 8.

6: The electronic device determines a sound source orientation of a sound producing object.

The electronic device may obtain, by using the processor 110, the first audio signal and the second audio signal stored in the memory 121 or in the storage device externally connected to the storage interface 120. The processor 110 of the electronic device invokes a relevant computer instruction to determine the sound source orientation of the sound producing object based on the first audio signal and the second audio signal.

Then the electronic device stores the sound source orientation in the memory 121 or the storage device externally connected to the storage interface 120.

7: The electronic device determines whether the sound producing object is directly facing the electronic device.

The electronic device may obtain, by using the processor 110, the sound source orientation stored in the memory 121 or in the storage device externally connected to the storage interface 120. The processor 110 of the electronic device invokes a relevant computer instruction to determine, based on the sound source orientation, whether the sound producing object is directly facing the electronic device. If the sound producing object is directly facing the electronic device, the electronic device may perform step 7 and step 8.

8: The electronic device replaces the first noise signal in the first audio signal to obtain a first audio signal with the first noise signal replaced.

The electronic device obtains, by using the processor 110, the first audio signal and the second audio signal stored in the memory 121 or in the storage device externally connected to the storage interface 120. The processor 110 of the electronic device invokes a relevant computer instruction to replace the first noise signal in the first audio signal with a sound signal in the second audio signal that corresponds to the first noise signal, so as to obtain the first audio signal with the first noise signal replaced, Then the electronic device may store the first audio signal with the first noise signal replaced in the internal memory 121 or in the storage device externally connected to the storage interface 120.

9: The electronic device filters the first audio signal to remove the first noise signal therein, so as to obtain a first audio signal with the first noise signal removed.

The processor 110 of the electronic device obtains the first audio signal stored in the memory 121 or in the storage device externally connected to the storage interface 120. The processor 110 of the electronic device invokes a relevant computer instruction to removes through filtering the first noise signal therein, so as to obtain the first audio signal with the first noise signal removed.

Then the electronic device may store the first audio signal with the first noise signal removed in the internal memory 121 or in the storage device externally connected to the storage interface 120.

10: The electronic device outputs the first audio signal.

The processor 110 directly stores the first audio signal in the memory 121 or in the storage device externally connected to the storage interface 120, and then outputs the first audio signal to another module that is capable of processing the first audio signal, for example, a denoising module.

In conclusion, the foregoing embodiments are merely intended to describe the technical solutions of this application, but not to limit this application. Although this application is described in detail with reference to these embodiments, persons of ordinary skill in the art should understand that they may still make modifications to the technical solutions described in the embodiments or make equivalent replacements to some technical features thereof, without departing from the scope of the technical solutions of the embodiments of this application.

As used in the foregoing embodiments, depending on the context, the term "when" may be interpreted to mean "if" or "after" or "in response to determining . . . " or "in response to detecting . . . ". Similarly, depending on the context, the phrase "when determining" or "if detecting (a stated condition or event)" can be interpreted to mean "if determining" or "in response to determining" or "when detecting (the stated condition or event)" or "in response to detecting (the stated condition or event)".

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. The computer program instructions, when loaded and executed on a computer, produce all or part of the processes or the functions according to the embodiments of this application. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, through a coaxial cable, an optical fiber, or a digital subscriber line) or wireless (for example, through infrared, radio, and microwave, or the like) manner. The computer-readable storage medium may be any usable medium accessible by a computer, or a data storage device, such as a server or a data center, integrating one or more usable media. The readable medium may be a magnetic medium (for example, a floppy disk, a hard disk, or a magnetic tape), an optical medium (for example, DVD), a semiconductor medium (for example, a solid state disk), or the like.

A person of ordinary skill in the art may understand that all or some of the processes of the methods in the embodiments may be implemented by a computer program instructing relevant hardware. The program may be stored in a computer readable storage medium. When the program is executed, the processes of the methods in the embodiments are performed. The storage medium includes any medium that can store program code, such as a ROM, a random access memory RAM, a magnetic disk, or an optical disc.

What is claimed is:

1. An audio processing method, wherein the method is applied to an electronic device, and the electronic device comprises a first microphone and a second microphone; and the method comprises:

converting, by the electronic device, a first input audio signal from a time domain to a frequency domain to obtain a first audio signal;

converting, by the electronic device, a second input audio signal from the time domain to the frequency domain to obtain a second audio signal;

obtaining, by the electronic device at a first time point, the first audio signal and the second audio signal, wherein the first audio signal is used to indicate information acquired by the first microphone, and the second audio signal is used to indicate information acquired by the second microphone;

determining, by the electronic device, that the first audio signal comprises a first noise signal, wherein the second audio signal comprises no first noise signal; and performing, by the electronic device, processing on the first audio signal to obtain a third audio signal, wherein the third audio signal comprises no first noise signal; wherein the determining, by the electronic device, that the first audio signal comprises a first noise signal comprises:

determining, by the electronic device according to a correlation between the first audio signal and the second audio signal, that the first audio signal comprises a first noise signal, and wherein the first noise signal is frictional sound produced by friction when a human hand or another object comes into contact with a microphone or a microphone pipe of the electronic device.

2. The method according to claim 1, wherein the first audio signal and the second audio signal correspond to N frequency points, and at least one of the frequency points comprises at least a frequency of a sound signal and energy of the sound signal, wherein N is an integer power of 2.

3. The method according to claim 1, wherein the determining, by the electronic device, that the first audio signal comprises a first noise signal further comprises:

computing, by the electronic device by using a previous frame of audio signal previous to the first audio signal and a first pre-determination tag corresponding to each one of frequency points in the first audio signal, a first tag of at least one of the frequency points in the first audio signal, wherein the previous frame of audio signal is an audio signal that is X frames apart from the first audio signal; the first tag is used to identify whether a first energy change value of a sound signal corresponding to the at least one of the frequency points in the first audio signal conforms to a characteristic of the first noise signal; the first tag being 1 is indicative that the sound signal corresponding to the at least one of the frequency points is a first noise signal, and the first tag being 0 means is indicative that the sound signal corresponding to the at least one of the frequency points is not a first noise signal; the first pre-determination tag is used for computing the first tag of the any at least one of the frequency points in the first audio signal; and the first energy change value is used to represent an energy difference between the at least one of the frequency points in the first audio signal and a frequency point in the previous frame of audio signal previous to the first audio signal, wherein the frequency point in the previous frame of audio signal has the same frequency as the at least one of the frequency points in the first audio signal;

computing, by the electronic device, a correlation between the first audio signal and the second audio signal at a corresponding frequency point; and determining, by the electronic device according to the first tag and the correlation, all first frequency points in all the frequency points corresponding to the first audio signal, wherein a sound signal corresponding to the first frequency point is a first noise signal, the first tag of the first frequency point is 1, and a correlation between the first frequency point and a frequency point in the second audio signal having the same frequency as the first frequency point is less than a second threshold.

4. The method according to claim 1, wherein before the performing, by the electronic device, processing on the first audio signal to obtain a third audio signal, the method further comprises:

determining, by the electronic device, whether a sound producing object is directly facing the electronic device; and the performing, by the electronic device, processing on the first audio signal to obtain a third audio signal specifically comprises:

when determining that the sound producing object is directly facing the electronic device, replacing, by the electronic device, the first noise signal in the first audio signal with a sound signal in the second audio signal that corresponds to the first noise signal, so as to obtain the third audio signal; and when determining that the sound producing object is not directly facing the electronic device, performing, by the electronic device, filtering on the first audio signal to remove the first noise signal therein, so as to obtain the third audio signal.

5. The method according to claim 4, wherein the replacing, by the electronic device, the first noise signal in the first audio signal with a sound signal in the second audio signal that corresponds to the first noise signal, so as to obtain the third audio signal specifically comprises:

replacing, by the electronic device, the first frequency point with a frequency point, in all the frequency points corresponding to the second audio signal, that has the same frequency as the first frequency point.

6. The method according to claim 4, wherein the determining, by the electronic device, whether a sound producing object is directly facing the electronic device specifically comprises:

determining, by the electronic device, a sound source orientation of the sound producing object based on the first audio signal and the second audio signal, wherein the sound source orientation represents a horizontal angle between the sound producing object and the electronic device;

when a difference between the horizontal angle and 90° is less than a third threshold, determining, by the electronic device, that the sound producing object is directly facing the electronic device; and when the difference between the horizontal angle and 90° is greater than the third threshold, determining, by the electronic device, that the sound producing object is not directly facing the electronic device.

7. The method according to claim 1, wherein before the obtaining, by the electronic device, a first audio signal and a second audio signal, the method further comprises:

acquiring, by the electronic device, the first input audio signal and the second input audio signal, wherein the first input audio signal is a current frame of audio signal in time domain resulting from conversion of a sound signal acquired by the first microphone of the electronic device in a first time period; and the second input audio signal is a current frame of audio signal in time domain resulting from conversion of a sound signal acquired by the second microphone of the electronic device in the first time period.

8. The method according to claim 7, wherein the acquiring, by the electronic device, the first input audio signal and the second input audio signal specifically comprises:

displaying, by the electronic device, a recording screen, wherein the recording screen comprises a first control;

detecting a first operation on the first control; and acquiring, by the electronic device in response to the first operation, the first input audio signal and the second input audio signal.

9. An audio processing method, wherein the method is applied to an electronic device, and the electronic device comprises a first microphone and a second microphone; and the method comprises:

obtaining, by the electronic device at a first time point, a first audio signal and a second audio signal, wherein the first audio signal is used to indicate information acquired by the first microphone, and the second audio signal is used to indicate information acquired by the second microphone;

when the electronic device determines that the first audio signal comprises a first frequency point, determining, by the electronic device, that the first audio signal comprises a first noise signal, wherein the second audio signal comprises no first noise signal; a first tag of the first frequency point is 1, and a correlation between the first frequency point and a frequency point in the second audio signal having the same frequency as the first frequency point is less than a second threshold; and the first tag is used to identify whether a first energy change value of a sound signal corresponding to at least one of frequency points in the first audio signal conforms to a characteristic of the first noise signal, and the first tag being 1 is indicative that the sound signal corresponding to the at least one of the frequency points is a first noise signal; and performing, by the electronic device, processing on the first audio signal to obtain a third audio signal, wherein the third audio signal comprises no first noise signal; wherein the determining, by the electronic device, that the first audio signal comprises a first noise signal comprises:

determining, by the electronic device according to a correlation between the first audio signal and the second audio signal, that the first audio signal comprises a first noise signal.

10. The method according to claim 9, wherein the first audio signal and the second audio signal correspond to N frequency points, and at least one of the frequency points comprises at least a frequency of a sound signal and energy of the sound signal, wherein N is an integer power of 2.

11. The method according to claim 9, wherein the when the electronic device determines that the first audio signal comprises a first frequency point, determining, by the electronic device, that the first audio signal comprises a first noise signal further comprises:

computing, by the electronic device by using a previous frame of audio signal previous to the first audio signal and a first pre-determination tag corresponding to at least one of frequency points in the first audio signal, a first tag of the at least one of the frequency points in the first audio signal, wherein the previous frame of audio signal is an audio signal that is X frames apart from the first audio signal; the first tag is used to identify whether a first energy change value of the sound signal corresponding to the at least one of the frequency points in the first audio signal conforms to a characteristic of the first noise signal; the first tag being 1 is indicative that the sound signal corresponding to the at least one of the frequency points is a first noise signal, and the first tag being 0 is indicative that the sound signal corresponding to the at least one of the frequency points is not a first noise signal; the first pre-determination tag is used for computing the first tag of the at least one of the frequency points in the first audio signal; and the first energy change value is used to represent an energy difference between the at least one of the frequency points in the first audio signal and a frequency point in the previous frame of audio signal previous to the first audio signal, wherein the frequency point in the previous frame of audio signal has the same frequency as the at least one of the frequency points in the first audio signal;

computing, by the electronic device, a correlation between the first audio signal and the second audio signal at a corresponding frequency point;

determining, by the electronic device according to the first tag and the correlation, all first frequency points in all the frequency points corresponding to the first audio signal, wherein a sound signal corresponding to the first frequency point is a first noise signal, the first tag of the first frequency point is 1, and a correlation between the first frequency point and a frequency point in the second audio signal having the same frequency as the first frequency point is less than a second threshold; and determining, by the electronic device, that the first audio signal comprises a first noise signal.

12. The method according to claim 11, wherein the replacing, by the electronic device, the first noise signal in the first audio signal with a sound signal in the second audio signal that corresponds to the first noise signal, so as to obtain the third audio signal specifically comprises:

replacing, by the electronic device, the first frequency point with a frequency point, in all the frequency points corresponding to the second audio signal, that has the same frequency as the first frequency point.

13. The method according to claim 9, wherein before the performing, by the electronic device, processing on the first audio signal to obtain a third audio signal, the method further comprises:

determining, by the electronic device, whether a sound producing object is directly facing the electronic device; and the performing, by the electronic device, processing on the first audio signal to obtain a third audio signal specifically comprises:

when determining that the sound producing object is directly facing the electronic device, replacing, by the electronic device, the first noise signal in the first audio signal with a sound signal in the second audio signal that corresponds to the first noise signal, so as to obtain the third audio signal; and when determining that the sound producing object is not directly facing the electronic device, performing, by the electronic device, filtering on the first audio signal to remove the first noise signal therein, so as to obtain the third audio signal.

14. The method according to claim 13, wherein the determining, by the electronic device, whether a sound producing object is directly facing the electronic device specifically comprises:

determining, by the electronic device, a sound source orientation of the sound producing object based on the first audio signal and the second audio signal, wherein the sound source orientation represents a horizontal angle between the sound producing object and the electronic device;

when a difference between the horizontal angle and 90° is less than a third threshold, determining, by the electronic device, that the sound producing object is directly facing the electronic device; and when the difference between the horizontal angle and 90° is greater than the third threshold, determining, by the electronic device, that the sound producing object is not directly facing the electronic device.

15. The method according to claim 9, wherein before the obtaining, by the electronic device, a first audio signal and a second audio signal, the method further comprises:

acquiring, by the electronic device, a first input audio signal and a second input audio signal, wherein the first input audio signal is a current frame of audio signal in time domain resulting from conversion of a sound signal acquired by the first microphone of the electronic device in a first time period; and the second input audio signal is a current frame of audio signal in time domain resulting from conversion of a sound signal acquired by the second microphone of the electronic device in the first time period;

converting, by the electronic device, the first input audio signal to frequency domain to obtain the first audio signal; and converting, by the electronic device, the second input audio signal to frequency domain to obtain the second audio signal.

16. The method according to claim 15, wherein the acquiring, by the electronic device, the first input audio signal and the second input audio signal specifically comprises:

displaying, by the electronic device, a recording screen, wherein the recording screen comprises a first control;

detecting a first operation on the first control; and acquiring, by the electronic device in response to the first operation, the first input audio signal and the second input audio signal.

17. The method according to claim 9, wherein the first noise signal is frictional sound produced by friction when a human hand or another object comes into contact with a microphone or a microphone pipe of the electronic device.

18. An electronic device for audio processing, wherein the electronic device comprises a first microphone and a second microphone, comprises:

a processor configured to:

convert, by the electronic device, a first input audio signal from a time domain to a frequency domain to obtain a first audio signal;

convert, by the electronic device, a second input audio signal from the time domain to the frequency domain to obtain a second audio signal;

obtain at a first time point the first audio signal and the second audio signal, wherein the first audio signal is used to indicate information acquired by the first microphone, and the second audio signal is used to indicate information acquired by the second microphone;

determine that the first audio signal comprises a first noise signal, wherein the second audio signal comprises no first noise signal; and perform processing on the first audio signal to obtain a third audio signal, wherein the third audio signal comprises no first noise signal; wherein the determine that the first audio signal comprises a first noise signal comprises:

determine according to a correlation between the first audio signal and the second audio signal, that the first audio signal comprises a first noise signal, and wherein the first noise signal is frictional sound produced by friction when a human hand or another object comes into contact with a microphone or a microphone pipe of the electronic device.

19. The electronic device according to claim 18, wherein the first audio signal and the second audio signal correspond to N frequency points, and at least one of the frequency points comprises at least a frequency of a sound signal and energy of the sound signal, wherein N is an integer power of 2.

* * * * *